United States Patent [19]
Strathman

[11] 4,159,484
[45] Jun. 26, 1979

[54] MULTI-COLOR, SINGLE GUN, SINGLE GRID/CATHODE BEAM INDEX CRT DISPLAY SYSTEM

[75] Inventor: Lyle R. Strathman, Cedar Rapids, Iowa

[73] Assignee: Rockwell International Corporation, El Segundo, Calif.

[21] Appl. No.: 901,912

[22] Filed: May 1, 1978

[51] Int. Cl.² .......................... H04N 9/24; H04N 9/62
[52] U.S. Cl. ........................................ 358/67; 358/10
[58] Field of Search ............................ 358/10, 66, 67; 315/370

[56] References Cited
U.S. PATENT DOCUMENTS

| 3,740,608 | 6/1973 | Manber et al. | 315/382 X |
| 3,893,165 | 7/1975 | Sunstein | 358/67 |
| 4,001,877 | 1/1977 | Simpson | 358/10 |

Primary Examiner—Richard Murray
Assistant Examiner—Aristotelis M. Psitos
Attorney, Agent, or Firm—Richard W. Anderson; Richard A. Bachand; H. Fredrick Hamann

[57] ABSTRACT

A multi-color display system employing a raster-scanned cathode ray tube having a single gun, single beam and without shadow mask. Vertical color stripe phosphor triads are carried on the face of the tube. During a predetermined one or ones of non-viewed raster lines, beam impingement on successive red stripes is optically detected and this sample pulse train is compared with a system clock defined reference pulse train which corresponds to red video on-times of the system. Center-line defining ones of the sample and reference pulses are phase compared to calculate a raster offset error for offset correction of the horizontal deflection signal for the ensuing raster frame, while pulse-pairs of respective ones of sample and reference pulses are examined for time-occurrence discrepancy and errors for successive pulse pairs are stored in corresponding digitally-defined horizontal sweep addresses for the pulse-pair for subsequently addressed readout of storage for horizontal sweep correction at each successive pulse pair address during ensuing lines of the raster frame. Digital correction means are utilized to correct both the horizontal and vertical beam deflection signals for tube geometry defined linearity errors on a continuous basis throughout each raster frame, while indexing for assurance of proper picture color content is accomplished on a sample basis prior to the viewable portion of each raster frame and determined horizontal deflection corrections imposed throughout that frame.

14 Claims, 18 Drawing Figures

$R$ = CENTER OF DISPLAY SURFACE BEAM RADIUS $M = \sqrt{y^2 + R^2}$ $O = \sqrt{x^2 + R^2}$ $N = \sqrt{x^2 + y^2 + R^2}$ $\cos \alpha_{xy} = \dfrac{R}{\sqrt{x^2 + y^2 + R^2}}$ $= \dfrac{1}{\sqrt{1 + \tan^2 \alpha_x + \tan^2 \alpha_y}}$ $\tan \alpha_{xy} = \sqrt{\tan^2 \alpha_x + \tan^2 \alpha_y}$

MULTI-COLOR, SINGLE GUN, SINGLE GRID/CATHODE BEAM INDEX CRT DISPLAY SYSTEM

BRIEF DESCRIPTION OF INVENTION

This invention relates generally to multi-color cathode ray tube systems and, more particularly, to a beam index type of multi-color cathode ray tube display system which employs a single gun, single beam cathode ray tube employing a plurality of red/green/blue vertical color stripe triads and a deflection system which causes the single cathode ray tube beam to be swept across and perpendicular to the color stripe triads. The indexing system precludes use of a shadow mask.

Multi-color cathode ray tubes commonly in use employ shadow-mask cathode ray tubes and three cathode ray tube beams which are caused to sweep across cathode ray tube screen phosphor depositions in synchronism, with the shadow mask providing an optical masking function which permits, upon proper convergence being established in the tube, each of the respective cathode ray tube beams to impinge predominantly only on the phosphor deposition associated with one of the particular three colors involved.

Shadow mask multi-color cathode ray tubes, as widely employed in the television industry, exhibit shortcomings when considered for avionics display usages. Shadow mask cathode ray tubes exhibit 15% to 20% beam current efficiencies because a large portion of the beam current is blocked from striking the phosphor and is absorbed by the shadow mask. Shadow mask cathode ray tubes presently available for avionics use are few in number, because the television industry caters to rather large screen sizes and the aspect ratio of all television shadow mask cathode ray tubes is 3×4. Therefore, desired square display formats may be obtained only by front panel masking and attendant waste of precious cockpit real estate. Further, the shadow-mask cathode ray tube is susceptible to the earth's magnetic field, degrouping of color beams (spreading) due to nonuniform field effects of beams, and beam deflection center changes due to deflection angle. Still further, the shadow mask cathode ray tube is subject to physical damage and short life due to the mechanics of the tube when such tubes are employed in vibrational environments encountered in aircraft cockpits.

Thus, in accordance with the objective of overcoming the shortcomings of shadow mask cathode ray tubes for avionics use, the present invention relates to a display system which employs a cathode ray tube without a shadow mask, and attains color definition throughout the display area by employing a beam indexing system. Beam indexing is a self position correcting display system, which senses beam position error on the face of the cathode ray tube and feeds back to the deflection and video circuits appropriate display position correcting signals. As such, the beam indexing system to be described, relies upon electronics rather than upon mechanical masking means to control the position of the beam in relationship to an applied video signal such that, in general, the beam always impinges on a red phosphor stripe during red video "on" time, and impinges on green and blue phosphor stripes only when respective green and blue "on" times are realized.

BACKGROUND OF THE INVENTION

Beam indexing is not a new technology; however, neither has it been successfully implemented to the point of commercial feasibility. Beam indexing systems of a type employing both a pilot beam and a writing beam have been exploited in the prior art (a method most widely publicized is the Philco "Apple Tube" which was developed and demonstrated in the mid 1950's). Briefly, the Philco Apple Tube is designed with a single gun having two beams, a writing beam and a pilot beam. Phosphor is deposited in sequential red, green and blue stripes with black, non-luminescent material the same width as the phosphor stripes laid between each color stripe to serve as a guard band. Each red stripe is backed with a stripe of secondary emitting material running the height of the screen. The pilot beam striking the secondary emitting stripes produces the sense signal, which is fed back to servo the deflection circuitry. Reference concerning description of the Philco Apple Tube beam indexing system is made to the following: "Television Receiver Uses One Gun Color CRT", electronics, June, 1956, Pages 151-153; "A New Beam Indexing Color Television Display System," R. G. Clapp, et al, Proceedings, I.R.E., Vol. 44, September, 1956, Pages 1108-1114; "A Beam Indexing Color Picture Tube—The Apple Tube", G. F. Barnett, et al, Proceedings I.R.E., Vol. 44, September, 1956, Pages 1115-1119; "Current Status of Apple Receiver Circuits and Components", L. A. Bloomsburg, et al, Proceedings I.R.E., Vol. 44, September, 1956, Pages 1120-1124. The Philco Apple Tube type of beam indexing system might best be described as a continuous beam indexing system in that such a system continually tries to correct for beam target errors throughout the scan.

Other types of single beam indexing systems operating on a continuous basis have been widely exploited in the art and generally comprise a single beam cathode ray tube employing special indexing stripes on the cathode ray tube face in addition to the red, green and blue stripes, the special indexing stripes being capable of emitting non-visible radiation from emitting substances capable of producing ultra-violet, x-ray, infrared, etc., emissions upon beam impingement thereon. These types of systems, again as in the Apple Tube indexing system, operate on a continuous basis as the beam is swept over the face of the tube, and are typified by teachings of the following patents: Chen, U.S. Pat. No. 3,732,359; Keizer, U.S. Pat. No. 2,809,233; Keizer U.S. Pat. No. 2,883,451; Sziklai U.S. Pat. No. 2,892,020; Schwartz U.S. Pat. No. 3,469,024; Thompson U.S. Pat. No. 3,875,450; Archakov U.S. Pat. No. 3,881,182; Fredendall U.S. Pat. No. 2,933,554; Chatten U.S. Pat. No. 3,041,391; Goodman U.S. Pat. No. 3,277,235; Goodman U.S. Pat. No. 3,691,424; Fumomoto U.S. Pat. No. 4,003,082; and Sunstein U.S. Pat. No. 3,893,165.

The above prior art teachings employ, to varying degrees of complexity, a special cathode ray tube face with indexing stripes geometrically associated with green, red and blue stripes and with means to detect nonvisible radiation from the indexing stripes for the purpose of effecting a beam indexing function. Again, the teachings in these references attempt to operate on a continuous basis as the beam is swept across the face of the tube.

Since beam indexing infers knowing where the beam is at any point in time, all such systems include a means for including linearity corrections as concerns the beam deflection. Linearity correction circuits employed for correcting pincushion distortion, for example, in the cathode ray tube have been highly exploited, as exampled in Eggert U.S. Pat. No. 3,487,164; Williams U.S. Pat. No. 3,517,252, Kapers U.S. Pat. No. 3,758,825; and Gray U.S. Pat. No. 3,422,306. These teachings relate to linearity correction due to known distortions encountered in a cathode ray tube deflection system where the radius between the gun and the tube face is less than that of the curvature of the tube face, per se, resulting in well known pincushion distortion.

Certain other known prior art techniques relating to linearity correction employ "sampling" techniques wherein the correction is determined for a particular point on the screen and this error, or correction, is extrapolated over a predetermined portion of each scan or over a predetermined area of the viewing screen. Systems of this type are exampled in Manber U.S. Pat. No. 3,740,608 and McCarthy U.S. Pat. No. 3,852,640.

The more recent teachings of Manber U.S. Pat. No. 3,740,608 and Horvath U.S. Pat. No. 3,714,496, employ storage of digital correction values associated with particular regions of the tube, and these correction values are subsequently called out to modify beam deflection signals. In these instances, however, the correction values are premeasured, as by microscopic comparison between template defined positions and actual beam positions.

Known prior art teachings are thus directed to (1) linearity correction of cathode ray tube deflection circuitries to overcome pincushion distortion (2) to the use of cathode ray tubes without shadow mask and employing continuous beam indexing systems utilizing special indexing stripes capable of emitting a nonvisible radiation which may be detected and utilized to effect a controlled relationship between beam position on the tube face and color phosphor depositions thereon (3) to such continuous beam indexing systems employing a writing beam and a pilot beam as well as to such systems employing a single beam and (4) means for storing correction values as a function of beam position for subsequent readout for beam position correction during a sweep sequence where the correction values are premeasured for a particular tube and placed in storage for readout and correction.

STATEMENT OF OBJECTS AND FEATURES

It is an object of the present invention to provide a new and improved beam indexing display system employing a single beam, multi-color, cathode ray tube wherein a sample (as opposed to continuous) beam indexing system measures beam target errors at some point or points on the cathode ray tube screen and extrapolates these errors to the remainder of the diplay system.

Another object of the present invention is to provide such a sample beam indexing system wherein the deflection of a single cathode ray tube beam is sensed as to linearity and colored phosphor deposition, with linearity and color registration errors automatically obtained for the particular tube with which the linearity and indexing system is employed, with such error being stored for subsequent readout and correction.

A further object of the present invention is the provision of a multi-color beam index cathode ray display system employing a cathode ray tube electronically identical to a monochrome (black and white) cathode ray tube, differing only in that sequential tripletts of red, green and blue phosphor stripes are deposited on the cathode ray tube.

A still further object is the provision of a beam indexing system with an improved beam position calculator/corrector circuitry which servos the deflection signals so that deflection and video track to present proper picture color content.

A still further object of the invention is the provision of a beam indexing system employing a single beam cathode ray tube which presents no convergence problems nor non-linear magnification/deflection problems.

Another object of the present invention is to provide a beam indexed cathode ray tube display system which is more rugged than a conventional shadow mask multicolor cathode ray tube display and which, in employing no shadow mask, provides for nearly 100% beam current efficiency.

The present invention is featured in the provision of a raster scan cathode ray tube display system, where analog deflection signals are developed from digital to analog conversion of binary counts which are respectively indicative of x and y beam deflections. The cathode ray tube employs a pattern of color phosphor stripe triads extending vertically across the tube face with the lines of the raster being perpendicular to the phosphor stripes. Means are provided for producing a linear reference pulse train corresponding to the video "on" time related to the red stripe in successive ones of the color stripe triads. Further means are employed for developing a sample train of pulses corresponding to actual beam impingement on successive ones of the red stripes during at least one horizontal scan of the beam. Means are employed for developing digital counts corresponding respectively to the time base and pulse phase displacements between the reference and beam sample pulse trains. Storage and readout control means are responsive to successive x deflection defining binary counts during a next succeeding raster frame to alter the linear x deflection binary count as a function of the time base and pulse phase displacement definitive errors. Both x and y linear deflection signals are corrected for tube geometry introduced linearity errors, with the x deflection signal being continuously corrected in accordance with determined errors at successive x-deflection addresses and with the time base error being subsequently applied as an offset gain correction in the x-deflection amplifier.

These and other features and objects of the present invention will become apparent upon reading the following description with reference to the accompanying drawings in which:

GENERAL OPERATION

Figure 1:
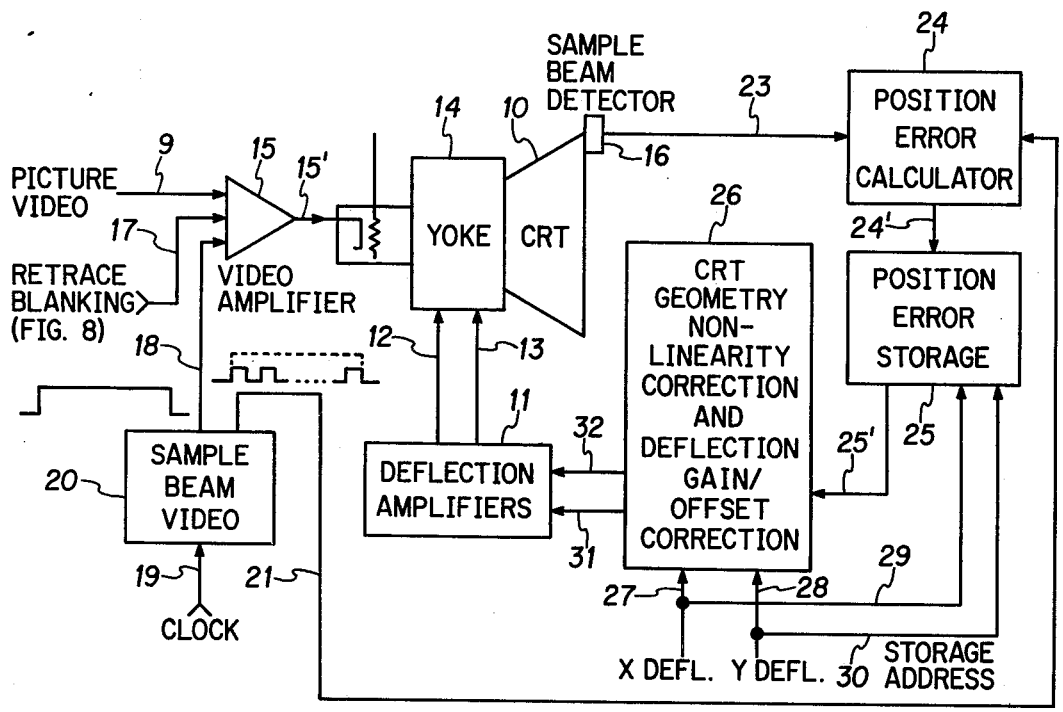
FIG. 1 represents a functional block diagram of a single beam, multi-color, beam index cathode ray tube display system in accordance with the present invention.

The beam indexing system to be described might generally be defined as a system which detects beam position error with respect to colored phosphor stripes on the cathode ray tube by effecting a measurement of this error for each one of the first (red) stripe of successive color stripe triads which are placed on the face of the cathode ray tube. The present invention may be generally defined as a sample indexing system, in that the system does not involve the determination of beam position error over the entire surface of the cathode ray tube, but rather effects an exacting determination of beam position error with respect to a clock-defined reference pulse train during one or more horizontal sweeps occurring in the non-viewed or off-screen portion of the tube, and extrapolates these errors to all successive lines in an ensuring raster field. The system refreshes itself with a new error determination once each frame. While prior art beam indexing concepts have involved the generation of a reference indexing pulse train for comparison with one actually generated by (and thus dependent for linearity and accuracy upon) the deflection voltages employed in the system, the systems have generally attempted to accomplish this on an essentially continuous basis, thus giving rise to the requirement for comparatively complex electronic control circuits and unnecessarily redundant error storage. Further, while known indexing systems have generated in some manner, a sample indexing pulse train (as developed by the impingement of the beam upon particular emitting areas on the tube face) for comparison with a clock defined reference pulse train, difficulties have been encountered in maintaining such a comparison in proper synchronism.

In the system of the present invention, a clock and associated counters develop linear X and Y deflection signals as respective digital counts. These counts are applied to digital to analog converters to develop respective analog deflection signals for the cathode ray tube. The system clock is also utilized to develop a linear pulse train corresponding to positions where the beam should impinge on successive red phosphor stripes. Due to geometrical distortion induced by linear deflection signals, means are employed to correct for nonlinearity of the raster such that, theoretically, the beam impinges on successive red stripes during successive red video "on-times" in the system. In order to assure that requirement, a sample detection means is employed to develop a second pulse train caused by actual impingement of the beam on successive red stripes. This sample pulse train is obtained by photodetection means oriented to detect successive red phosphor emissions as the beam scans through one or more lines in a non-viewable portion of each raster frame. A beam position error digital servo determines the displacement of a horizontal center-line defining reference pulse and the next time occuring one of the detected sample pulses to develop an x deflection correction which is applied as an offset to the x deflection amplifier, thus establishing a time base synchronism between the reference and sample pulse trains. The time displacement between each successive pair of respective reference and sample pulses is determined at successive clock-defined red stripe addresses during the line sampling time, and any discrepancy is stored as a correction factor in the corresponding address of a random access memory. During each successive horizontal sweep of the ensuing frame, the stored errors are addressed out of the random access memory and used to correct the linear x deflection count corresponding to that address. Beam indexing is thus automatically determined for any given cathode ray tube, since the position errors at each successive red stripe are first measured for that tube and then stored, and subsequently read out during successive horizontal scans in the ensuring frame. The correction determined during the sample scanning period is then assumed to apply during successive scans of that frame.

DETAILED DESCRIPTION OF THE INVENTION

The beam indexing display system of the present invention is depicted generally in the functional diagram of FIG. 1. The cathode ray tube 10 for the sample beam indexing display system to be described is electronically identical to a monochrome cathode ray tube. It would differ, however, from a monochrome cathode ray tube in that sequential tripletts of red, green and blue phosphor stripes would be deposited on the face of the cathode ray tube. The phosphor stripes would be guardbanded with a narrow stripe of black, nonluminescent material of, for example, 0.001 to 0.002 inches in width. Deflection amplifiers 11 supply respective horizontal and vertical deflection signals 12 and 13 to the yoke 14 of the cathode ray tube 10. A video amplifier 15 supplies beam on-off control input 15' to the cathode ray tube 10. Video amplifier 15 receives clock synchronized picture video input 9, a retrace blanking input 17, and a sample beam video enabling gate input 18. A clock source 19 is supplied to a sample beam video generating circuitry 20, which develops the control gate output 18 applied to the video amplifier 15, as well as an output pulse train 21, which, as will be further described in detail, comprises clock-defined pulses corresponding to red video on-times for a particular horizontal sweep of the cathode ray tube electron beam. Pulse train 21 from the sample beam video generating circuitry 20 will be referred to herein as a reference red pulse train, and is applied as a first input to a position error calculator 24. Position error calculator 24 receives a second input 23 comprising a train of optically detected pulses generated by the impingement of the cathode ray tube beam on successive ones of the red stripes in the red/green/blue triads placed vertically across the cathode ray tube face. A sample beam detector 16 is generally depicted at FIG. 1 as being associated with the upper portion of the cathode ray tube face. The function of this detector is to optically develop sample beam pulse train 23. The position error calculator 24, as will be further described, effectively servos the deflection signal so that deflection and video track, to thereby present proper picture color content. Position error calculator 24 provides measured error output 24' as an input to a position error storage means 25. Position error storage means 25 provides an output 25' as input to a CRT geometric non-linearity correction and deflection gain/offset correction circuitry 26 wherein the error is utilized to correct linear x deflection and deflection inputs 27 and 28 which are supplied to the correction circuitry 26. FIG. 1 further depicts generally and functionally the application of the linear x deflection signal and linear y deflection signal on lines 29 and 30 as further inputs to the position error storage circuitry 24, the latter inputs serving as addressing means for errors held in storage circuitry 24 deflection defined addresses. The correction circuitry 26 outputs a a corrected (indexed) x deflection output signal 31 and a corrected y deflection output signal 32 as input to respective x and y deflection amplifiers in deflection amplifier circuitry 11. As above mentioned, and further to be described in detail, the correction circuitry 26 effects a correction for geometrical nonlinearities in the observed raster on the cathode ray tube 10, as well as indexing and registering the beam position such that it coincides precisely with successive ones of red phosphorus stripes during a clock-defined interval corresponding to the video on-time for successive red stripes.

In general operation, when no picture video is being written on the cathode ray tube, sample beam video circuitry 20 generates a gate on line 18 to turn on the cathode ray tube beam, and simultaneously generates a train of clock defined pulses on line 21 corresponding to successive red video on-times. The sample beam video gate 18 and reference pulse train 21 are synchronized to the red on-time of the normal picture video. The sample beam detector 16 associated with the cathode ray tube 10 senses a sequence of pulses 23 corresponding to the impingement of the beam on successive red phosphorus stripes. The sequence of pulses 23 is frequency and phase compared to the reference pulse train 21 in position error calculator 24. For each red stripe, a time period error ($\Delta t = 1/\Delta f$) is calculated and stored for that particular screen location. When the detected sample beam crosses the screen center red stripe, a phase error ($\Delta \phi$) is calculated, and likewise stored. As the cathode ray tube is subsequently scanned through the remainder of the ensuing frame, the stored time ($\Delta t$) errors are addressed by the x deflection signals on input line 29 to the position error storage circuitry 25. The center-line determined phase error ($\Delta \phi$) is applied to the corrected x deflection signal as a display offset signal throughout that frame. $\Delta t$ errors for all x addresses and $\Delta \phi$ (the offset error) are refreshed prior to the viewable portion of each successive frame.

Figure 2A:
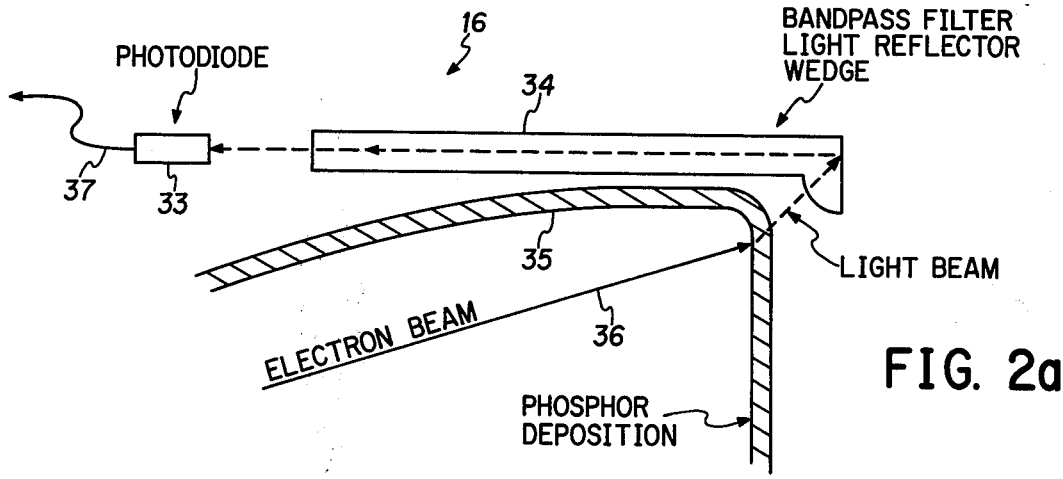
FIGS. 2A and 2B, respective side and top views of a sample beam detector, as useable in the system of FIG. 1.
Figure 2B:
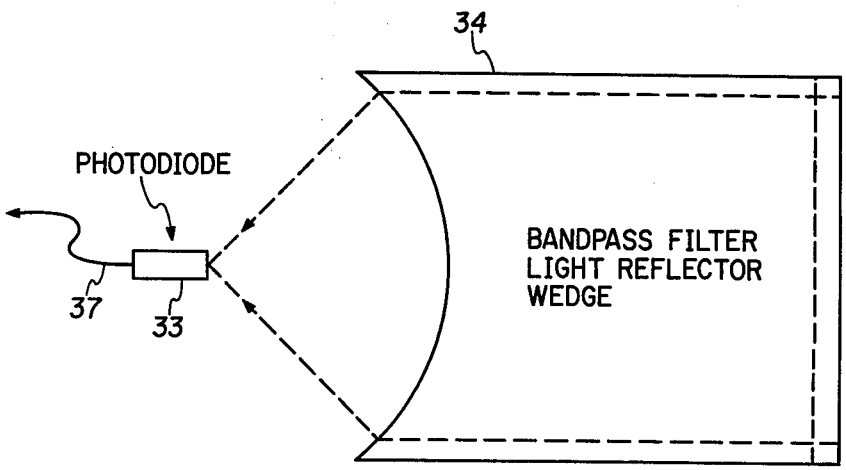

With reference to FIG. 2, sample beam detector 16 of the system of FIG. 1 comprises a photo diode 33 fixed-mounted with respect to a band pass light reflector wedge 34. Light reflector wedge 34 may be mounted over the upper extreme of the cathode ray tube envelope 35 and may be masked from the observer. The location of the light reflecting wedge and photo diode arrangement need not be precise, that is, it bears no exacting relationship with respect to the tube envelope or the phosphor stripe triads deposited thereon. As the tube electron beam 36 sweeps across the tube, red phosphor luminous impulses are optically picked up by the light beam wedge and focused to the photo diode 33 such that diode 33 develops an output pulse train 37 corresponding to the impingement of the cathode ray tube beam on successive ones of the red stripes on the cathode ray tube face. The photo diode output 37 is definitive of the red sample pulse train and is subsequently compared with the reference red pulse train 21 in determining position errors.

Figure 3A:
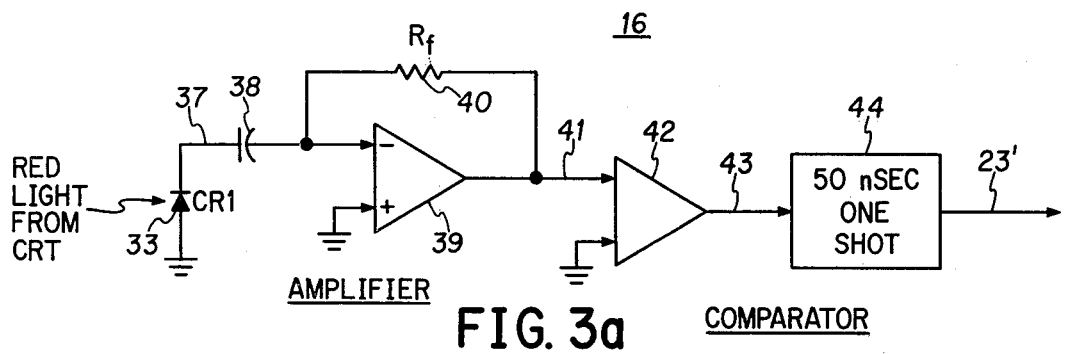
FIG. 3A is a functional schematic diagram of a sample beam detector circuitry as employed in the system of FIG. 1.
Figure 3B:
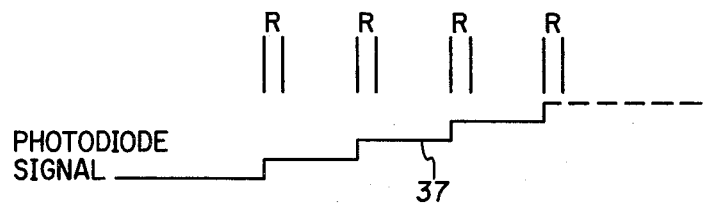
FIG. 3B, operational waveforms of the detector circuitry of FIG. 3A.

Referring now to FIG. 3A, a particular embodiment of the sample beam detector 24 of FIG. 1 is shown in conjunction with the photo diode member 33. Photo diode 33 is capacitively coupled through capacitor 38 to an operational amplifier 39 which includes a feedback resistor 40. Amplifier 39, feedback resistor 40 and capacitor 38 form a differentiating circuit which provides leading edge detection of the output from photo diode 33, as depicted in FIG. 3B. The photo diode output signal 37 comprises a successively built up DC component which results from the slow decay characteristic of phosphor luminence and reflected ambient light. The differentiated output 37 from diode 33 as depicted in FIG. 3B comprises a train of pulses defining the leading edges of the successive stepped output 37 from the photo diode. The output 41 from the differentiator is applied as first input to a comparator 42 to produce an output 43 having improved signal-to-noise ratio, with the pulse train 43 being applied to a 50-monosecond one-shot multivibrator 44 which produces an output pulse train 23' comprised of defined width pulses corresponding to the beam impingement on successive red stripes. Output 23' from the one-shot multivibrator 44 then corresponds to the sample beam red pulse train 23 of FIG. 1, which is applied to the position error calculator 22.

Figure 4:
FIG. 4, an alternate sample beam detector circuitry as might be employed in the system of FIG. 1.
Figure 4:
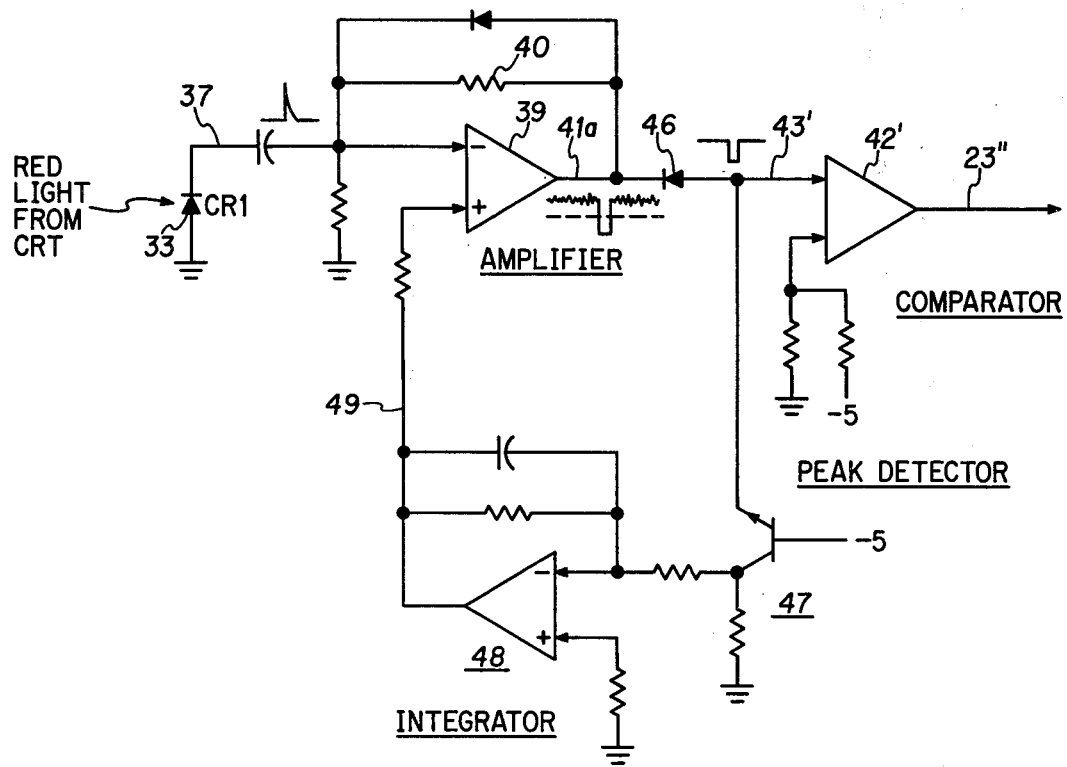

An alternate embodiment of a sample beam detector, as depicted in FIG. 4, provides for automatic noise rejection and further improvement in the signal-to-noise ratio. In FIG. 4, the output 37 from the diode 33 is again capacitively coupled to an operational amplifier 39 provided with a feedback resistor 40 so as to develop a differentiated output waveform 41a. Output 41a as coupled through a diode member 46 to provide a first input 43' to a comparator 42' and an input to a peak detector 47. The output of peak detector 47 is applied to an integrator 48, with the output 49 from the integrator 48 comprising a second input to the operational amplifier 39. With the arrangement of FIG. 4, an output pulse train 43' is developed, which is immune from noise perturbations and exhibits a preferred improvement in signal-to-noise ratio as compared to the circuitry of FIG. 3A. Again, the output from the comparator 42' may be applied to a one-shot multivibrator to develop the sample red pulse train for subsequent comparison with the reference red pulse train in determining beam position error.

As above described generally, with reference to FIG. 1, the clock-defined reference red pulse train 21 and the detected red pulse train 23 obtained from the sample beam detector 16 are applied to a position error calculator for the purpose of determining correction errors to be applied to the linear x deflection signal to assure that the beam impinged on successive ones of the red stripes during clock-defined red video on-time. One of the more critical elements of the sample beam index system of the present invention is the ability of this position error calculator to accurately measure the difference between the time base of the red video reference signal 21 (from the sample beam video generating circuitry) and the time base of the red luminence signal 23 (the detected red pulse train from the sample beam detector). The position error calculator of the present invention compares the sample red beam pulse train and the reference red pulse train to determine two position errors. The first error calculated by the position error calculator 24 is that of time base difference which may be expressed as:

$$\Delta t = t_{ref.} - t_{det.} \tag{1}$$

The second error is that of phase difference between the pulse trains which may be expressed as:

$$\Delta\phi = (\omega t_{ref.} + \phi_{ref.}) - (\omega t_{det.} + \phi_{det.}) \tag{2}$$

where $$\omega t_{ref.} = \omega t_{det.} \tag{2a}$$

Figure 5:
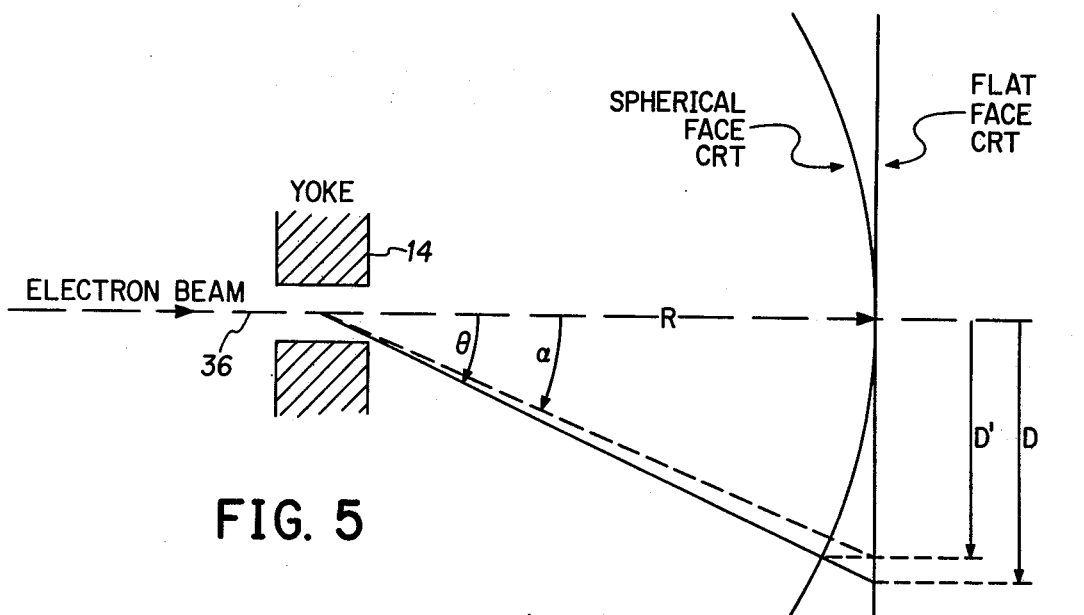
FIG. 5, a geometrical representation of beam deflection nonlinearity as experienced in a cathode ray tube.

The phase difference error ($\Delta\phi$) represents an overall necessary shifting of the train of detected sample red pulses to line this pulse train up with the clock-generated reference pulse train, while the time base error ($\Delta\phi$) is uniquely determined for triplett related pulse pairs of respective reference and detected red pulses. As indicated in equations (2) and (2a) above, the phase error must be determined when the time bases of the reference red pulses and the detected red pulses are identical. This latter condition is apparent from consideration of the tube face and beam geometry depicted in FIG. 5, which illustrates the deflection of an electron beam onto a flat faced cathode ray tube. It illustrates how pincushion distortion occurs. It is noted that the geometry defines a nonlinear deflection factor at all beam positions other than through the horizontal center of the screen. Referring to FIG. 5, linear deflection $\theta$ causes D' on a spherical face or D on a flat face and it is noted that linear deflection multiplied by cos $\alpha$ causes D' on a flat faced cathode ray tube. It is further noted that the geometry of FIG. 5 defines $$\cos \alpha = \frac{1}{\sqrt{1 + \sin^2 \theta}} = \frac{1}{\sqrt{1 + \tan^2 \alpha}}.$$

FIG. 5 thus shows that the incremental deflection factor through the horizontal center of the screen is linear, since the x deflection signal approaches zero. Therefore, a maxim can be stated that $\omega_{ref} = \omega_{det.}$ along the horizontal center line of any cathode ray tube.

Since the time to scan a horizontal line in any system is known, and the phosphorus stripe spacings for the tube are known, $\omega$ can be established, and is established by the clock which drives the sample beam video circuitry of FIG. 1. Therefore, along the horizontal center line of the screen:

$$\omega t_{ref.} = \omega t_{det.}$$

$$\omega_{ref.} = \omega_{det.}$$

$$\Delta t = 0 = t_{ref.} - t_{det.} \text{ and}$$

$$\Delta\phi = \phi_{ref.} - \phi_{det.}$$

Furthermore, it can be stated that the calculated $\Delta\phi$ is constant for all horizontal scans.

The deflection geometry of FIG. 5 thus defines a nonlinear deflection factor at all positions other than through the horizontal center of the screen and, in accordance with the present invention, a red reference center pulse, corresponding to the point where the beam impinges normal to the tube face, and thus gives rise to no geometrical nonlinearity, is compared with the detected center pulse. With the reference center pulse lined up with the corresponding detected sample pulse, remaining lack of linearity or lack of registry between corresponding pulse pairs is then measured and stored for each red stripe deflection address. In general, the reference and detected red pulse trains are sampled and the correct beam deflection is determined for each red stripe. These errors are extrapolated across the associated striped triad (assumed to apply for the horizontal line segment defined for that stripe triad). These errors may then be applied to the corresponding x deflection segment during each of the successive lines in the raster frame.

Figure 6A:
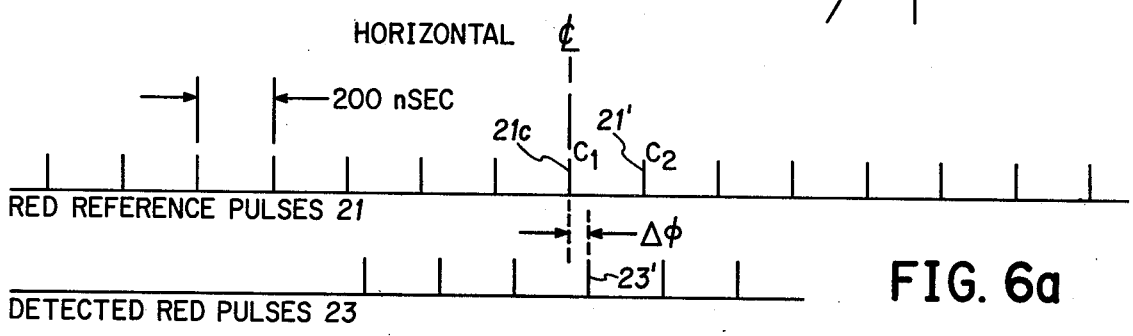
FIG. 6A, relative exampled relationships between color stripe reference pulses and detected pulses of that color as employed in the system.

In accordance with the present invention, the simplest and most accurate method of implementing the phase difference error $\Delta\phi$ is to perform an incremental adjustment each picture frame. By utilizing this procedure, gross miscalculations and color shifting are precluded. Reference is made to the red reference pulse train 21 and detected red pulse train 23 as depicted in FIG. 6A. Assuming a 15-megacycle clock and 256 color triads across the face of the CRT, the sweep system causes the red stripes to occur periodically every 200 nanoseconds and, with three color stripes within the 200 nanosecond period, each stripe is 66 nanoseconds wide. In FIG. 6A, the reference red pulse train 21 is depicted as successive pulses at 200 nanosecond intervals and includes a reference horizontal centerline red pulse C1 identified as pulse 21c which will be further referred to as a clock-defined red reference center line pulse. The reference red pulse train 21 is shown in particular timed relationship with the detected red pulse train 23, it being realized that each of the pulse trains would comprise 256 pulses and that fewer than this number are depicted in FIG. 6A for purposes of clarity.

Figure 6B:
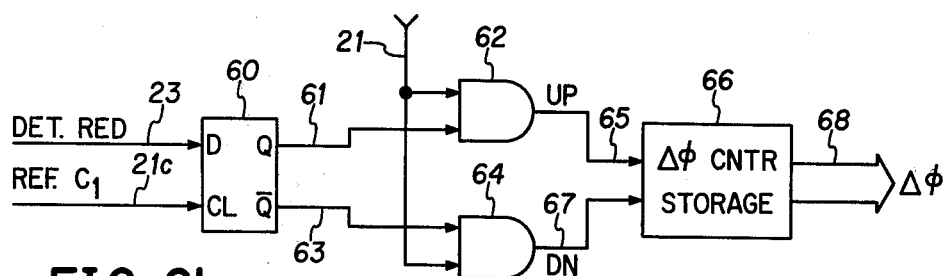
FIG. 6B, a functional schematic diagram of a circuitry for determining the time base error between center defined ones of reference and detected pulses.

Referring to FIG. 6A, the red reference pulse train 21 includes a center pulse 21c which is related to the center one of the 256 red phosphor stripes on the tube face. At this center line defined position, FIG. 6A depicts a phase discrepancy $\Delta\phi$ between the reference center line pulse 21c and the next time occurring one of the detected red pulses 23. Since at this center-line defined position, the incremental deflection factor is linear, it is at this position that the phase relationship between the reference and detected red pulse train is determined. It is to be emphasized that the phase error is made at the center line position where there is no geometrically introduced nonlinearity in the sweep system. An incremental phase difference calculator is employed to measure the phase error $\Delta\phi$ pictured in FIG. 6A. Reference is made to FIG. 6B which illustrates an embodiment of an incremental phase difference calculator as may be employed in the present invention. The detected red pulse train 23 is applied to the D input of flip-flop 60, and the reference red pulse center line pulse 21c is applied to the clock input of flip-flop 60. The Q output 61 of flip-flop 60 is applied as a first input to AND gate 62, while the $\overline{Q}$ output 63 of the flip-flop is applied as a first input to AND gate 64. The reference red pulse train 21 is applied as a second input to each of AND gates 62 and 64. The output 65 from AND gate 62 is applied to the count-up input of a $\Delta\phi$ counter storage element 66, and the output 67 from AND gate 64 is applied to the count-down input of the $\Delta\phi$ counter storage element 66. An eight-bit output 68 from the $\Delta\phi$ counter 66 comprises a digital indication of the error $\Delta\phi$ depicted in FIG. 6A. In operation, flip-flop 60 causes the binary state appearing at the D input to appear on the Q output line 61 at the time occurrence of a clock input. Thus, flip-flop 60 places the binary state existing in the detected red reference pulse train 23 on Q output line 61 at the time occurrence of the reference red center line pulse 21c. Assuming the phase relationship depicted in FIG. 6A between the reference and detected red pulse trains, the binary level of the detected red pulse train 23 is at zero at the time occurrence of the referenced center line pulse train 21c, and thus a zero is loaded into flip-flop 60 and appears on the Q output line 61. The $\overline{Q}$ output 63 from the flip-flop appears as a binary one input to AND gate 64. Now, at the time occurrence of the next succeeding one of the red reference pulses 21 after the red reference center line post 21c, this pulse, 21', appears as a second input to AND gate 64, whereupon AND gate 64 supplies a binary one output on line 67 which effects a one least significant bit down-increment to the $\Delta\phi$ counter/storage circuitry 66. As will further be described, the output from the $\Delta\phi$ counter storage element 66 is fed as an offset adjustment to the x deflection signal development circuitry which will shift the horizontal deflection left of center. This procedure will continue with incremental one least-significant-bit down-increments to the $\Delta\phi$ counter/storage element until the detected red reference pulse 23' lines up with the red reference center line pulse 21c. When alignment occurs, AND gate 62 is provided with a binary one input on the Q output line 61 from flip-flop 60, and a second input at the binary one level effected by the aligned detected red pulse 23; whereupon AND gate 62 provides a binary one output on line 65 to effect a one least significant bit up-increment into the $\Delta\phi$ counter/storage element 66. With the output from the $\Delta\phi$ counter storage element being applied as offset to the x deflection signal development circuitry, the beam is caused to have a right shift deflection adjustment. This procedure then continues through the remainder of the display on-time and $\Delta\phi$ is incrementally adjusted, plus or minus one least significant increment, that is, the $\Delta\phi$ output 68 from the $\Delta\phi$ counter/storage element acts as a type of servo, which adjusts itself to one least-significant-bit of accuracy and continues to hunt by one least significant bit about the coincidence point between the red reference center-line pulse 21c and the detected red pulse 23' in FIG. 6A. Since, as above exampled, the red stripes occur periodically every 200 nanoseconds, eight bits of counter/storage are employed in the $\Delta\phi$ counter/storage element 66; however, the accuracy is 200 nanoseconds divided by 256 which is well beyond the rise time of logic employed. Therefore, the actual $\Delta\phi$ calculation error becomes that of the rise times of the reference and the detected signals. Using standard low power Shotkey elements, the rise time error is plus or minus $t_R$ which is approximately equal to plus or minus 5 nanoseconds. Further, since there are three colored stripes within the 200 nanosecond period, each being 66 nanoseconds wide, the phase error is approximately plus or minus ten percent, which will not cause color shifting in a striped phosphor cathode ray tube. Assuming a 60-hertz refresh display system, it would take a maximum of four seconds for phase-lock to occur.

In accordance with the present invention, upon the afore-described phase difference error $\Delta\phi$ having been calculated, and utilized as an offset error correction for the horizontal deflection signal, the invention employs a time base difference calculator, whereby each red reference pulse 21 is compared with the corresponding one of the detected red pulses 23 and a time difference error $\Delta t$ is measured for each successive pulse pair. As will further be described in detail, this latter comparison is preconditioned upon the horizontal deflection signal having been also adjusted for pincushion distortion due to the beam/tube geometry. In addition to center line defining pulses having been adjusted to be within one least significant bit of being in synchronism, the successive pulse pairs of respective reference and detected red pulses are each uniquely examined for any time difference therebetween in a circuitry employing essentially the same incremental correction technique as above described for the phase difference calculator.

Figure 7:
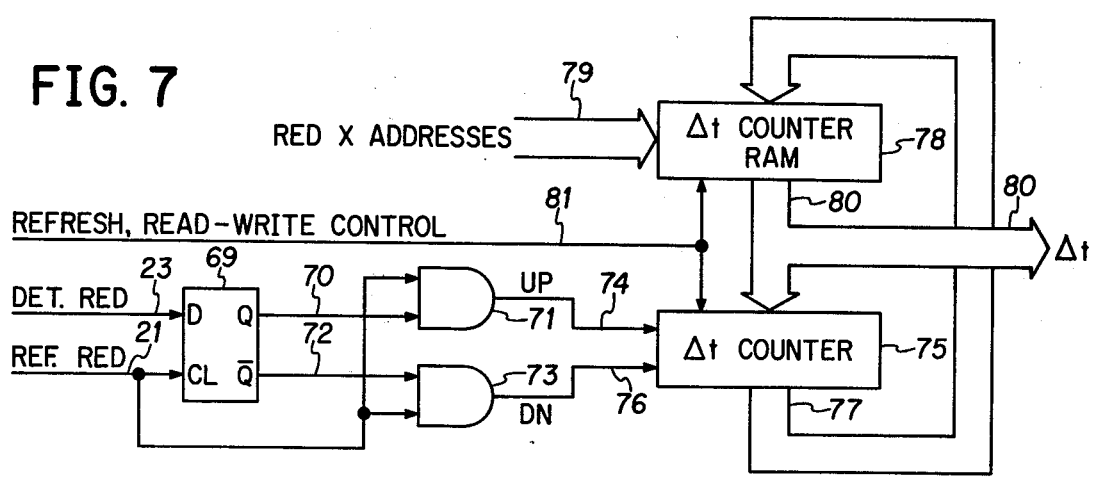
FIG. 7, a functional schematic diagram of a circuitry for defining and storing and updating the error between successive pairs of respective detected and referenced red pulses for subsequent readout.

Referring to the time base difference calculator of FIG. 7, the detected red pulse train 23 is applied to the D input of a flip-flop 69 and the red reference pulse train 21 is applied to the clock input of flip-flop 69. The $\overline{Q}$ output 70 of flip-flop 69 is applied as a first input to AND gate. The Q output 72 of flip-flop 69 is applied as a first input to AND gate 73. The red reference pulse train 21 is applied as a second input to each of AND gates 71 and 73. Output 74 from AND gate 71 is utilized as an up-incrementing control input to a $\Delta t$ counter 75, and output 76 from AND gate 73 is applied as a down-incrementing input to the $\Delta t$ counter 75. The operation of flip-flop 69 and AND gates 71 and 73 is similar to that described for the phase difference calculator in FIG. 6B, with phase difference determinations now being based on the comparison between successive pulse pairs of respective red reference pulses 21 and detected red pulses 23. As generally depicted in FIG. 7, the eight-bit output 77 from $\Delta t$ counter 75 is applied to a $\Delta t$ storage RAM 78, which is addressed by an eight-bit red x address input 79. An eight-bit output 80 from $\Delta t$ storage RAM 78 is applied as an updating input to the $\Delta t$ counter 75 and also comprises the $\Delta t$ error output. Also depicted generally in FIG. 7 is a refresh, read/write control input line 81 which is applied as a controlling input to both the $\Delta t$ storage RAM 78 and the $\Delta t$ counter 75. In general operation, the $\Delta t$ storage RAM 78 is addressed by the successive red stripe x addresses. The contents of that address, as stored in $\Delta t$ storage RAM 78, are loaded into the $\Delta t$ counter 75, which is then one least significant bit incremented or decremented and the updated count restored at the same storage address. During the remainder of the picture frame, the contents of the Δt storage are sequentially fed as a correction to the horizontal deflection circuitry according to the red x address. Assuming 256 color triplets across the cathode ray tube screen, the Δt storage RAM 78 requires 256 address locations of eight bits each, or 2048 bits of random access memory (RAM).

The synchronization and timing related to the development of a Δt correction factor for successive red x addresses and synchronous tie-in with the system clock as concerns the refresh and rewrite control for the storage and counter elements will be further described in detail. It would suffice presently to state that the time base difference calculator generally depicted in FIG. 7 measures a time difference correction factor for each successive pair of respective red reference and red detected pulses, and that this correction factor is stored and updated or refreshed once each frame. The actual sequence involves addressing the Δt storage RAM 78 by a red x address, loading the instantly stored error Δt from RAM 78 into the counter 75, incrementing or decrementing the counter 78 in accordance with the positions of successive pairs of respective red reference and red detected pulses and writing the updated Δt count back into the same red x address in the Δt storage RAM 78.

As thus far described, very accurate time base differences and phase shift errors concerning the reference and detected red pulse trains have been described. It remains now to describe how this information is utilized to correct the deflection signals so that beam-phosphor alignment is controlled across the face of the cathode ray tube screen.

It is well known that various types of distortion produce pronounced pictorial results on a flat faced cathode ray tube. Uniform pincushion distortion occurs only when the vertical yoke is centrally aligned. Because the beam index system of the present invention utilizes horizontal error sampling techniques, the vertical yoke must be accurately aligned, for if it is not accurately aligned, non-uniform distortion will result, and the sample beam index system is rendered inoperable. Inaccurate horizontal alignment, however, is self-correcting with the use of the aforedescribed position error calculator. The manner in which pincushion distortion is considered and incorporated into the beam indexing system of the present invention will now be considered. If on-axis correction as shown in FIG. 5 is applied to the deflection signal, display non-linearities will still exist, due to pincushion effect. That is, one cannot merely multiply linear horizontal deflection by the cosine of the angle $\alpha$ depicted in FIG. 5. For a valid correction other than on-axis, reference is made to the diagram of FIG. 13 and its accompanying analysis of deflection in two dimensions. It is seen from FIG. 13 that the on-axis display points identified as x and y, may be corrected by linear multiplication of the linear deflection signal by $\cos\alpha_x$ and $\cos\alpha_y$, respectively. The on-axis corrections may be then defined as:

$$X_{corr.} = x_{lin.} \cos\alpha_x$$

$$Y_{corr.} = Y_{lin.} \cos\alpha_y$$

Figure 13:
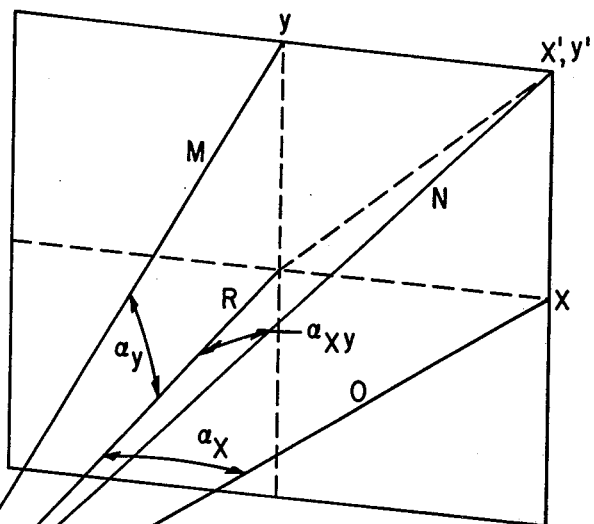
FIG. 13, a diagramatic representation of beam deflection nonlinearity, as experienced on a flat cathode ray tube surface.

The off-axis, or three-dimensional points, identified in FIG. 13 as x', y', are corrected by linear multiplication of the linear deflection signal by $\cos\alpha_{xy}$, as indicated by the following expressions:

$$X' = X_{lin.} \cos\alpha_{xy}$$

$$Y' = Y_{lin} \cos\alpha_{xy}$$

However, the term, $\cos\alpha_{xy}$ is a difficult term to calculate, this term being defined as:

$$\cos\alpha_{xy} = \frac{R}{\sqrt{X^2 + Y^2 + R^2}}$$

FIG. 13, however, illustrates that the function $\tan\alpha_{xy}$ is a relatively simple term to determine, this term being defined as:

$$\tan\alpha_{xy} = \sqrt{\tan^2\alpha_x + \tan^2\alpha_y} \text{ ; and}$$

$$\tan^2\alpha_{xy} = \tan^2\alpha_x + \tan^2\alpha_y.$$

Therefore, in accordance with the present invention, the term $\tan^2\alpha_x$ is determined, and a simple read-only memory (ROM) is used to convert $\tan^2\alpha_x$ values to $\cos\alpha_{xy}$ values.

Figure 12:
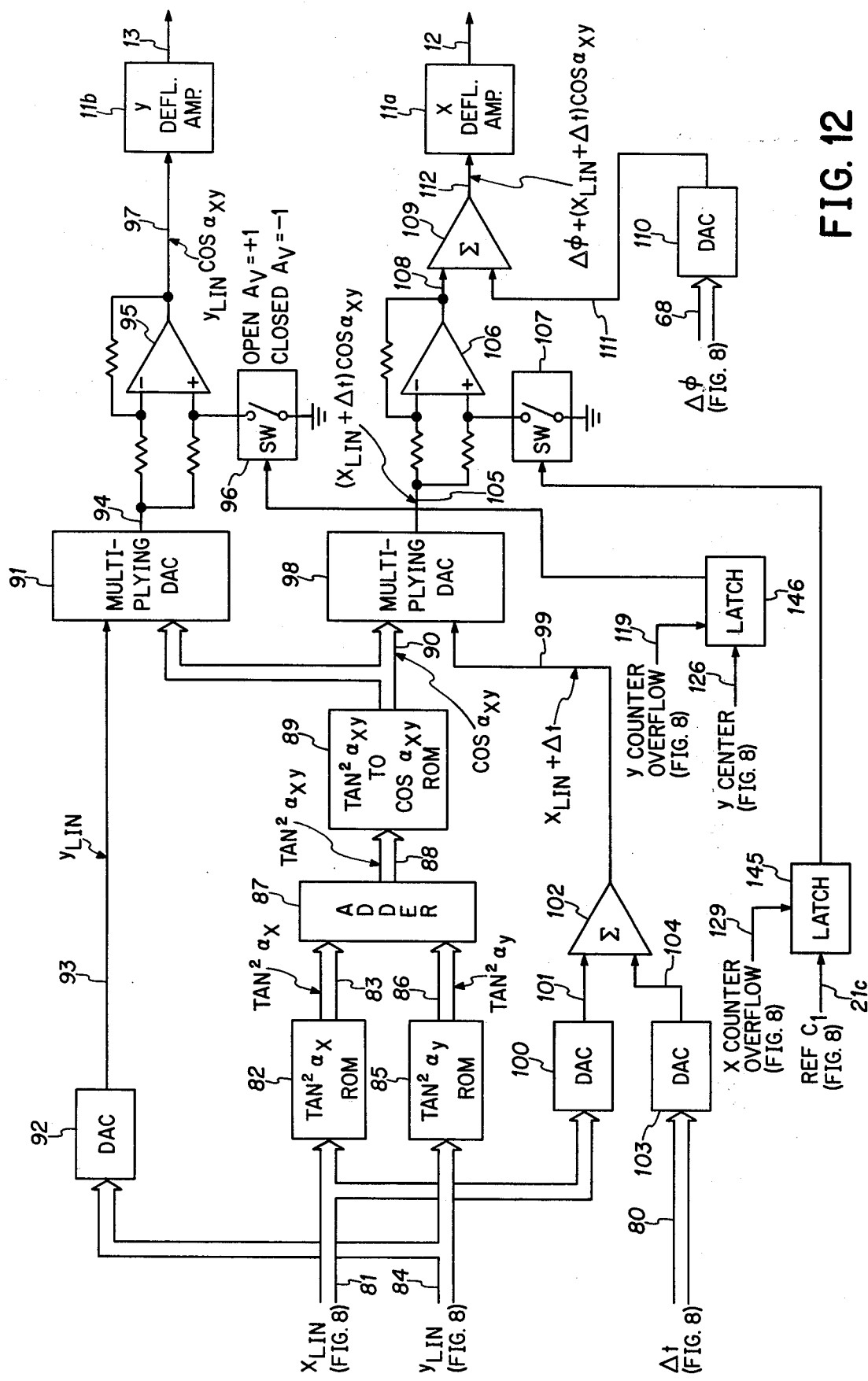
FIG. 12, a functional diagram of the deflection signal generating circuitry of the beam indexing system in conjunction with error correction inputs as developed by the beam indexing system.

FIG. 12 shows the manner in which both the horizontal and vertical deflection is linearized in accordance with the present invention, and further how the Δt (times base differences) and Δφ (phase shift) errors are inserted into the horizontal deflection system.

As shown in FIG. 12, X LINEAR and Y LINEAR digital deflection counts are utilized to address respective $\tan^2\alpha$ ROM's. The X LINEAR deflection count 81 is applied as an addressing input to a $\tan^2\alpha_x$ ROM 82 to provide a binary output 83 representing the $\tan^2\alpha_x$ function value for each particular x linear address, each successive x address defining an angle $\alpha_x$ and the $\tan^2\alpha_x$ value for that angle being stored at that address in ROM 82. Similarly, the Y LINEAR deflection signal input 84 is applied as an addressing input to a $\tan^2\alpha_y$ ROM 85 which responds to each successive Y LINEAR input binary address with an output 86 corresponding to the $\tan^2\alpha_y$ value defined by that Y address. The $\tan^2\alpha_x$ output 83 from ROM 82 and the $\tan^2\alpha_y$ output 86 from ROM 85 are applied as respective inputs to a binary adder 87, the output 88 of which, in accordance with the above-defined expression, $\tan^2\alpha_{xy} = \tan^2\alpha_x + \tan^2\alpha_y$ equates to $\tan^2\alpha_{xy}$. The $\tan^2\alpha_{xy}$ binary output 88 of adder 87 is applied to a conversion ROM 89 which provides an output 90 corresponding to the $\cos\alpha_{xy}$ value for each inputted $\tan^2\alpha_{xy}$ count. $\cos\alpha_{xy}$ is the desired nonlinearity correction factor for the X LINEAR and Y LINEAR defined three-dimensional points x' and y' on the face of the tube. Thus, FIG. 12 applies the $\cos\alpha_{xy}$ correction factor present on the output 90 of ROM 89 as a first digital input to each of a pair of multiplying digital-to-analog converters. In the upper portion of FIG. 12, output 90, the linearity correction factor term, is applied as a first input to a multiplying digital-to-analog converter 91. The Y LINEAR address input 84 is applied through a digital-to-analog converter 92 to supply an analog input 93 to the multiplying digital-to-analog converter 91. The multiplying digital-to-analog converter 91 supplies an ouput 94, which comprises the product of the inputs thereto and which is thus defined as $Y_{lin.} \cos\alpha_{xy}$ which is the linearity corrected Y LINEAR deflection signal. Output 94 from the multiplying digital-to-analog converter 91 is depicted in FIG. 12 as first being applied to amplifier 95 which, under control of an electronic switching means 96, functions selectively as either an inverting or noninverting amplifier, with the output 97 from amplifier 95 carrying the correct algebraic sign as concerns the corrected Y deflection signal which is applied to the Y deflection amplifier 11b. This selective inversion of the output from the multiplying digital-to-analog converter 91 is employed so that single-quadrant multiplication may be used for simplification. As will be further described, the operation of electronic switch 96 is under the control of the Y addressing circuitry, switch 96 being closed to effect a negative output 97 from amplifier 95 upon the Y address center-count being experienced, and maintained in this condition until the Y counter experiences an overflow signifying vertical retrace.

A second multiplying analog-to-digital converter 98 receives the $\cos\alpha_{xy}$ linearity correcting term 90 from ROM 89 as a digital input thereto. Here, the analog input 99 is defined as the summation of successive X LINEAR deflection signals 81 with the aforedescribed $\Delta t$ (time base difference) error 80 calculated for that X LINEAR address. Referring to FIG. 12, the X LINEAR digital input deflection signal 81 is applied to a digital-to-analog converter 100, the output 101 of which is applied as a first input to an analog summing circuitry 102. The $\Delta t$ error for the existing X LINEAR address 81 (as present on line 80, FIG. 8) is applied as an input to a digital-to-analog converter 103, the output 104 of which comprises a second input signal to analog summing means 102. The output from summing means 102 thus comprises an analog representation of the X LINEAR address summed with the $\Delta t$ correction factor for that X LINEAR address. Thus, the output 105 from multiplying digital-to-analog converter 98 comprises the $\Delta t$ corrected X LINEAR address multiplied by the linearity correction factor $\cos\alpha_{xy}$ defined by that X address. This output is applied to an amplifier 106 which, under the control of electronic switch 107, operates either as an inverting or a noninverting amplifier to establish the algebraic sign of the product developed on output 105 of the multiplying digital-to-analog converter 98. As will be further described in detail, the electronic switch 107 is controlled as a function of the x deflection count in the system and, in general, is closed to impart a negative algebraic sign from the X center address to the end of the X sweep. The output 108 from amplifier 106 is applied as a first input to a further signal summing means 109. The phase difference error, $\Delta\phi$ as developed in the position error calculator of FIG. 8 on line 68, is applied to a digital-to-analog converter 110 to provide a second input 111 to the summing circuit 109. The output 112 from the summing means 109 is defined as $\Delta\phi + (^xLin. + \Delta t)\cos\alpha_{xy}$. The $\Delta\phi$ term is imposed as an offset correction as previously described, with the $\Delta t$ corrected X LINEAR signal being multiplied by the linearity correction factor $\cos\alpha_{xy}$. Corrected x deflection output 112 is applied to the X deflection amplifier 11a.

The overall correction as depicted in FIG. 12 is thus comprised of both a necessary linearity correction to remove pincushion distortion existing in the system, with each successive X deflection address being modified by its associated calculated $\Delta t$ correction factor and subsequently combined with the $\Delta\phi$ offset correction. The Y LINEAR addresses are corrected only for linearity by being multiplied by the correction factor, $\cos\alpha_{xy}$ to remove pincushion distortion therefrom. It is to be appreciated that the X signal is additionally corrected in accordance with the aforedescribed $\Delta t$ correction terms, since the indexing system is utilized in accordance with a vertically striped colored cathode ray tube, and a corrected X sweep to assure color registration is necessary. This correction, as measured for a single raster line, may be logically assumed to be applicable for all horizontal lines in the display raster.

FIG. 12 depicts the X linear and Y linear addresses as well as the respective outputs from the ROM's and adders as being ten-bit digital signals. This requirement is established by an assumed line resolution requirement of a 525 line system with 512 lines utilized for display. Ten bits of resolution are thereby required. The multiplying digital-to-analog converters 91 and 98 are also ten-bit devices and may, for example, comprise commercially available Hybrid Systems Corporation type DAC 390-D-11 high speed multiplying digital-to-analog converters.

Noteworthy as concerns the correction system depicted in FIG. 12 is that the $\Delta\phi$ (phase shift) correction term is summed with the corrected X deflection signal after all other corrections are applied, thus permitting linear X and Y deflection addresses as developed in conventional binary counters to be employed as addressing inputs which themselves constitute X and Y deflection defining signals after corrections are applied thereto.

Figure 10:
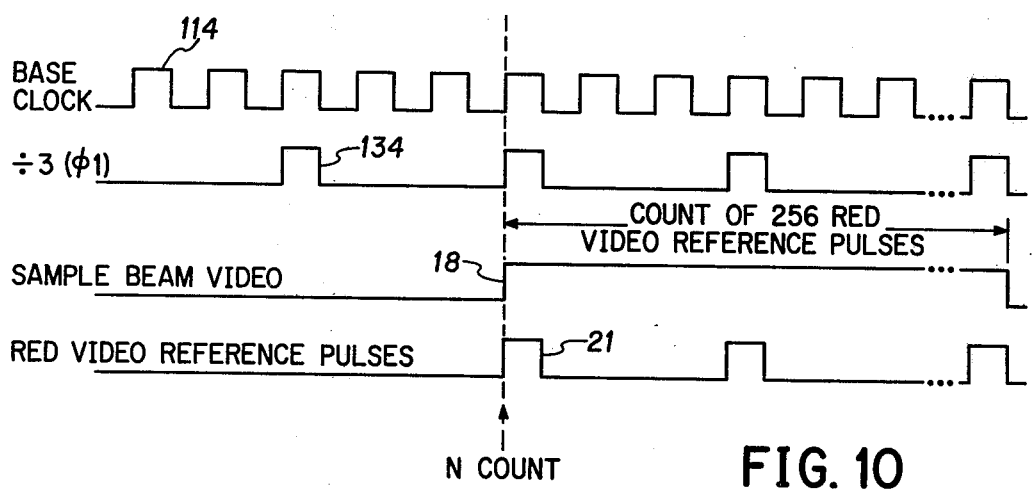
FIG. 10 operational waveforms depicting operation of the control system of FIG. 8.
Figure 11:
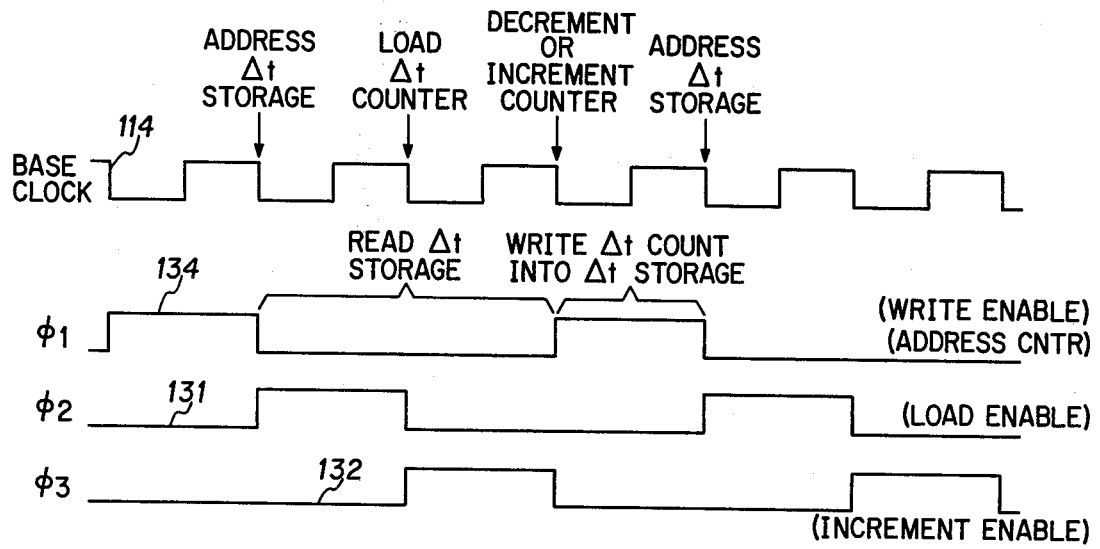
FIG. 11, further operational waveforms depicting the operation of the control circuitry of FIG. 8.

The system as depicted in FIG. 12 is noted to receive X and Y linear deflection signals as inputs thereto, along with $\Delta t$ correction factors for successive X LINEAR addresses, a $\Delta\phi$ offset correction factor as concerns the X deflection signal, and control inputs related to specific counts in the X and Y address development means. Also, the description of the position error calculating circuitries depicted in FIGS. 6b, and 7, which develop the $\Delta\phi$ and $\Delta t$ correction factors, refers to particular clock-defined red pulse trains, red X addresses, red center line defined red reference pulse and a clock synchronized refresh and read/write control as concerns the $\Delta t$ storage and $\Delta t$ counter updating functions. The particular manner in which the system herein described operates under a clock defined synchronous control system will now be defined, with reference to the detailed diagram of FIG. 8, an exampled X and Y count defined raster and display system depicted in FIG. 9, and the operational waveforms of FIGS. 10 and 11.

Figure 9:
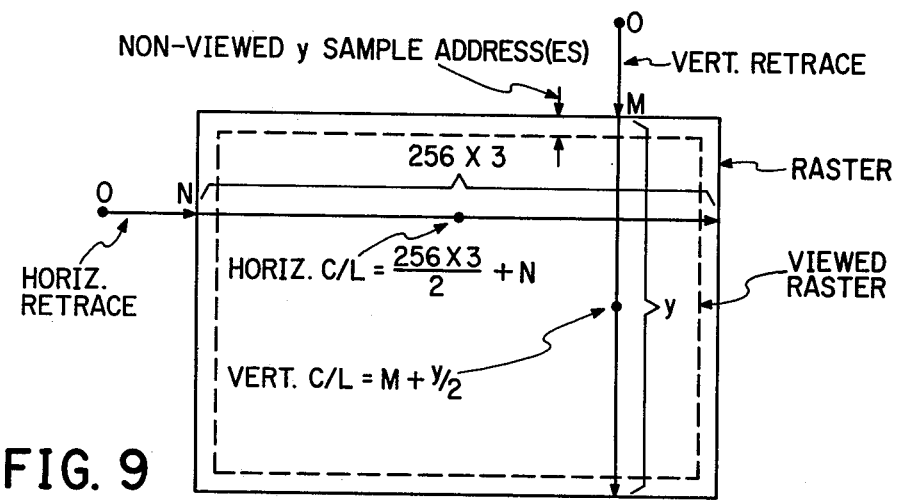
FIG. 9, a diagramatic representation of an exampled binary count defined raster as may be employed.

The beam indexing system operates on the basis of clock controlled generation of horizontal and vertical deflection counts which collectively sequence to provide for the generation of a raster on a cathode ray tube face. For purposes of an exampled embodiment of a synchronous control to be herein described, FIG. 9 diagrammatically represents a digitally-defined raster which might be employed. Horizontal (x) deflection is defined by a digital count from 0 to a count of N to define a horizontal retrace interval followed by a plurality of 256×3 counts which define each horizontal line. Since we example 256 color stripe triads, each containing three color phosphor stripes, the horizontal centerline of the raster depicted in FIG. 9 may be defined as a count of $(256\times3)/2 + N$. The vertical deflection is depicted by a count from 0 through M, which defines the vertical retrace period of the raster, followed by a count of Y, which might comprise 525 counts of which 512 are to be displayed, thus defining an initial plurality of counts depicted in FIG. 9 as nonviewed Y sample addresses. The count system of FIG. 9 then defines the vertical center line of the viewed raster as a count of M+Y/2. In the exampled embodiment to be herein described, beam sampling during which the detected red pulse train is generated, is effected during a single horizontal sweep defined by a Y deflection address which falls in the nonviewed Y sample address portion of the raster depicted in FIG. 9.

Figure 8:
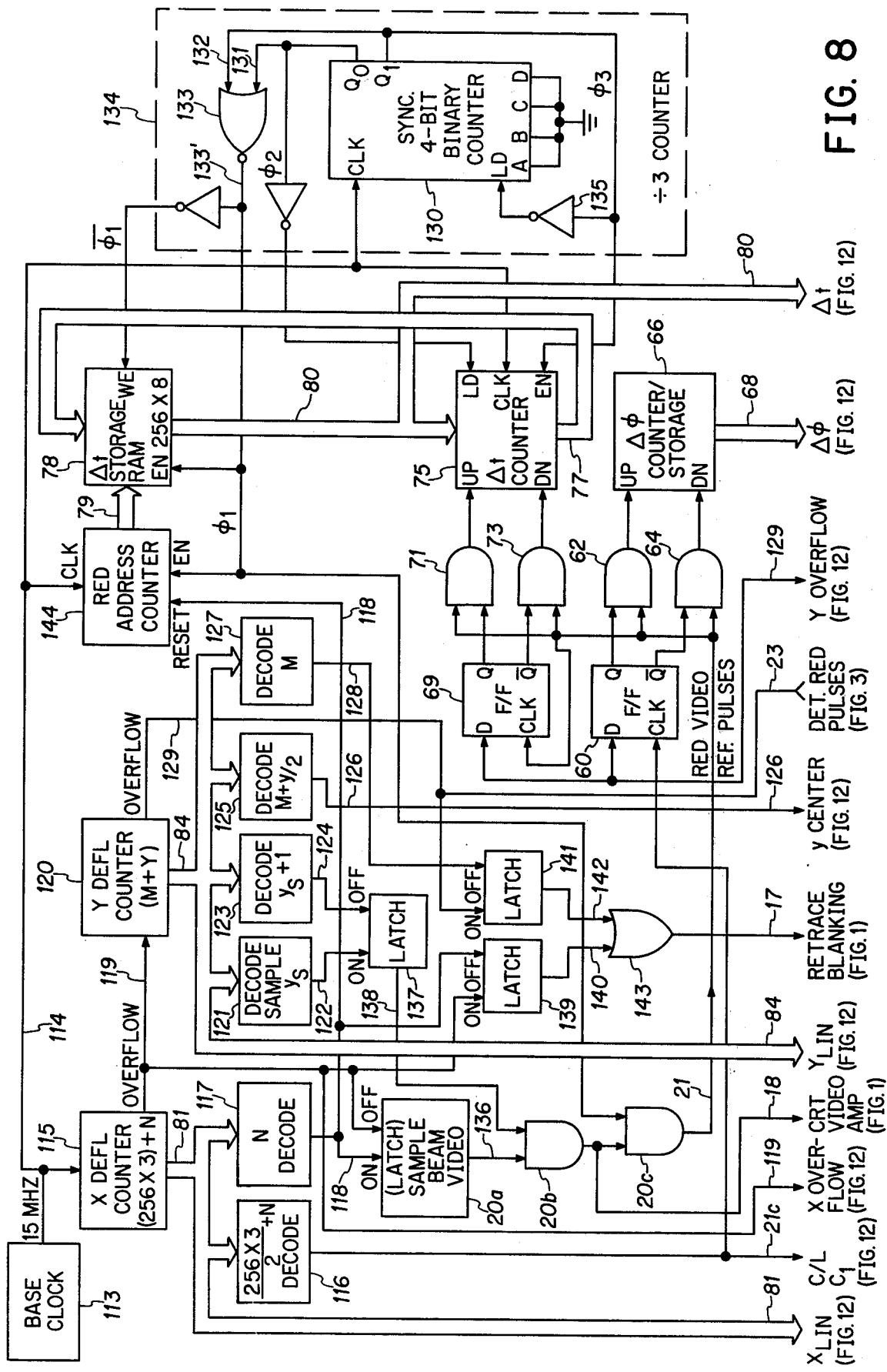
FIG. 8, a functional diagram of an embodied error determination and control circuitry for the system of FIG. 1.

Referring now to the control system embodiment of FIG. 8, all control functions are synchronously established by a base clock 113 operating at 15 MHz. The clock output on line 114 is utilized to develop X and Y binary counts definitive of the raster generation depicted in FIG. 9. Clock output 114 is additionally utilized to control the operation of the position error calculating circuitry from which the corrections $\Delta\phi$ and $\Delta t$ are developed. Clock output 114 is further utilized to generate vertical and horizontal retrace blanking signals as concerns the raster, is utilized to generate the aforedescribed red reference pulse train which is utilized during a specific one of the nonviewed Y addresses; and is utilized to turn the CRT beam on during that specific Y address to generate the detected red pulse train.

Considering first the generation of the linear x and y binary deflection signals, the clock output 114 is applied to an x deflection counter 115 which may comprise a binary counter whose full count is defined as $(256 \times 3)+N$, to produce the X LINEAR deflection count on line 81 which is inputted to the correction system of FIG. 12. The X LINEAR deflection count on line 81 is applied to a decoder 116 which outputs a signal when a count of $(256 \times 3)/3+N$ is inputted on line 81. This decoder output 21c comprises the horizontal center line control pulse which is inputted into the correction system of FIG. 12 and which is additionally utilized as a clocking pulse in the aforedescribed position error circuitry which generates the correction signal $\Delta\phi$.

The linear X deflection count on line 81 is further applied to an N decoder 117, the output 118 of which comprises a control pulse occurring on an X count of N being inputted. Reference to FIG. 9 illustrates that this count of N corresponds to the end of the horizontal retrace period and the initiation of the raster lines. Use of this control signal 118 will be further described.

Successive overflows of the X deflection counter 115, as they appear on overflow line 119, are applied as a clock input to a Y deflection counter 120, which may comprise a binary counter of ten-bit length, whose full count capability corresponds to M+Y. The linear Y deflection count output 84 from the Y deflection counter 120 is applied as the Y LINEAR input to the correction system of FIG. 12 and additionally to a plurality of decoders, each producing a discrete output signal when particular Y counts are outputted on the Y LINEAR line 84. A first decoder 121 produces an output 122 upon a Y count of $Y_s$ being experienced. $Y_s$ corresponds to the Y address of a selected horizontal line during which beam sampling is to be effected. With reference to FIG. 9, this $Y_s$ count might correspond to any one of Y sample addresses lying in the non-viewed upper portion of the raster. A further decoder 123 decodes a count of $Y_s+1$ produces a control output on line 124 upon the count of $Y_s+1$ being generated.

A decoder 125 decodes a count of M+Y/2 to produce an output on control line 126 upon the count of M+Y/2 being generated. This count, which corresponds to the vertical center of the raster, is applied as a control input to the correction circuitry of FIG. 12. A still further decoder 127 decodes a Y deflection count of M and produces an output on control line 128 upon the count of M being generated. Reference to FIG. 9 illustrates the count of M corresponds to the end of the vertical retrace period and the initiation of the Y count sequence, which defines the raster.

Referring again to FIG. 8, the overflow output 119 from the X deflection counter 115 is additionally utilized in control functions as well as being applied as an X overflow control line to the correction circuitry of FIG. 12. The overflow 129 from the Y deflection counter 120 is illustrated in FIG. 8 as being utilized as a control function in FIG. 8, as well as being applied as a Y overflow signal to the correction circuitry of FIG. 12.

The red reference pulse train, herein previously described as being a clock synchronous pulse train, is developed in FIG. 8 under control of the base clock 113. The clock output 114 is applied as input to a $\div 3$ counter 134. Counter 134 operates to produce three output pulse trains designated $\phi_1$, $\phi_2$ and $\phi_3$, which collectively operate as a three-phase clock source as concerns development of the reference red pulse train and the aforedescribed refresh and read/write control of the time difference generator of FIG. 7 which develops the $\Delta t$ correction signals applicable to each successive red address. Referring now to FIG. 8, the clock output 114 is applied as clock input to a synchronous four-bit binary counter 130 which forms a portion of the $\div 3$ counter 134. Counter 130 might comprise a commercially available type 54S161 counter. The $Q_o$ output 131 from counter 130 and the $Q_1$ output 132 of the counter are applied as respective inputs to a NOR gate 133, the output 133' of which comprises a pulse train of one-third the base clock repetition rate and designated $\phi_1$. Pulse train $\phi_1$ comprises a train of pulses corresponding to the referenced time position of successive ones of red phosphor stripes on the cathode ray tube screen. The $Q_1$ output 132 from counter 130, per se comprises a $\phi_2$ clock train of one-third the repetition rate of the base clock, and the $Q_1$ output 132, per se, comprises the $\phi_3$ clock pulse train output. The $\phi_3$ pulse train is applied through inverter 135 as a load input to the synchronous four-bit binary counter 130. For purposes of the present invention, the three-phase output from the $\phi_3$ counter 134 is collectively employed to effect the refresh and read/write control of the time difference calculator previously described with reference to FIG. 7 and embodied in the control diagram of FIG. 8, more detailed description of which will follow. For the present, the $\phi_1$ pulse train output from the $\div 3$ counter 134 which corresponds to the reference red video on time of the system and, thus, to the reference red video pulses, is utilized to provide a train of red video reference pulses during a defined sampled one of the horizontal scans of the raster. This pulse train is generally depicted in FIG. 2 as being the output 21 of a sample beam video development circuitry 20, which additionally outputs a gate 18 to turn the video amplifier of the system full on for the duration of the reference pulse train 21. Circuitry to develop the video gate and corresponding pulse train of red video reference pulses is depicted in FIG. 8. Reference is again made to the x deflection counter 115, the overflow output 119 therefrom, and the decoder 117 which outputs a control pulse 118 upon a count of "N" being developed in the x deflection counter. The output 118 from the "N" decoder 117 is applied as a first input to a latch 20a. The second input to the latch 20a comprises the overflow 119 from the x deflection counter 115. The output 136 from latch 20a therefore comprises an enabling gate corresponding to the width of each successive horizontal line in the raster (see FIG. 9).

The gates on line 136 from the sample beam video latch 20a, corresponding to x deflection counts between "N" and (N+256×3) for each raster line, are applied as a first input to an AND gate 20b. For purposes of the red video pulse train, as utilized herein, it is desired to turn on the video amplifier for the time duration of only one of the horizontal lines of the raster, that line being the selected sample y line in the nonviewed upper portion of the raster. For this purpose, FIG. 8 utilizes the output from the y sample decoders 121 and 123 which receive the y deflection count 84 as an input thereto. Decode 121 produces an output 122 upon sample line $Y_s$ being initiated, while decoder 123 produces an output upon this Y sample line being completed. The decoder outputs 122 and 124 are replied as respective control inputs to a latch 137, the output 138 of which corresponds to the time duration of the sample horizontal line only, and is used as a second (enabling) input to AND gate 20b, such that the output 18 from AND gate 20b comprises the sample beam video gate which is utilized to turn the video amplifier of the cathode ray tube full on during this nonviewed horizontal sample line. The output 18 from AND gate 20b is applied as a first input to a further AND gate 20c which receives the $\phi_1$ red video pulse train as a second input thereto. Therefore, the output 21 from AND gate 20c comprises a red video train of 256 pulses within the time interval defined by the duration of the sample beam video gate 18. Reference is made to the operational waveforms of FIG. 10 which depict the base clock waveform 114, the reference red video pulse train 133', the sample beam video gate 18 being initiated upon a count of N being experienced in the X deflection counter, and the red video reference pulses 21 which are developed during the time duration of the sample beam video gate 18. The sample beam video gate 18, in addition to being applied to turn the cathode ray tube video amplifier full on during the sample horizontal line, is also employed as an enabling gate to select the clock synchronous red video reference pulses which occur during this line interval. Thus, during the sample line interval, the video amplifier is turned full on such that the sample beam detector develops the detected red pulse train, while simultaneously a train of 256 red reference pulses corresponding to successive red video on-times is generated for comparison with the red sample pulse train for the aforedescribed purpose of developing $\Delta\phi$ and $\Delta t$ correction signals.

FIG. 8 further illustrates development of a retrace blanking control signal which is applied as an input to the video amplifier 15 of FIG. 1 to blank the screen during horizontal and vertical retrace times. For this purpose, a latch 139 receives the x deflection counter overflow 119 as a first input and the output 118 of the N decoder 117 as a second input. Latch 139 then develops an output gate 140, the width of which corresponds to the horizontal retrace time in the deflection system (see FIG. 9). A further latch 141 receives the Y deflection counter overflow 129 as a first input thereto, and the output 128 of the M decoder 127 as a second input thereto to develop a control gate output 142, the width of which corresponds to the vertical retrace of the deflection system (See again FIG. 9).

The two gates developed by latches 139 and 141 are applied to an OR gate 143, the output 17 of which comprises both the horizontal and vertical retrace blanking gates and this output 17 is applied as a blanking input to the video amplifier 15 of FIG. 1.

Previous description with regard to FIG. 7, concerning the development of the $\Delta t$ correction signals associated with successive red X addresses alludes to a refresh and read/write control to control the addressing, correction count updating and refreshing of the $\Delta t$ storage circuitry 78 and $\Delta t$ counter 75 associated with the time difference calculator. Reference is now made to FIG. 8 wherein the circuitry of FIG. 7, as well as that of the phase difference calculator depicted in FIG. 6b, are shown in their controlled relationship with clock synchronous control signals. A red address counter 144 receives the base clock input 114 and develops an eight-bit output 79 corresponding to sequential X addresses which correspond to the red phosphor stripes on the tube face. The $\phi_1$ clock output from the ÷3 counter 134, corresponding to the reference time position of successive red video on-times, is applied as an enabling input to the red address counter 144, while the output 118 from the N decoder 117 is applied as a reset input to the red address counter 114. Red address counter might comprise a commercially available type 54S161 counter. Counter 144 outputs successive addresses on line 79 corresponding to the reference addresses of successive red phosphor stripes on the cathode ray tube face. This address output 79 is applied to $\Delta t$ storage random access memory 78, which may comprise a commercially available 256×8 Fairchild type 93410A RAM. Addressed $\Delta t$ errors are outputted on RAM output 80 as input to the $\Delta t$ counter 75, and additionally comprise the $\Delta t$ input to the correction circuitry of FIG. 12. Now, referring again to the ÷3 counter 134 and the development of the three-phase output $\phi_1/\phi_2/\phi_3$, reference is made to FIG. 11, wherein this three phase output is depicted in synchronous time relationship with respect to the base clock output 114. Referring to FIG. 8, the $\phi_1$ output 133' is inverted and applied as a write enable input to the $\Delta t$ storage RAM 78. The $\phi_1$ output is applied directly as an enabling input to $\Delta t$ storage RAM 78, as well as an enabling input to the red address counter 144. The $\phi_2$ output 131 is inverted and applied as a load input to the $\Delta t$ counter 75. The base clock 114 is applied as clock input to $\Delta t$ counter 75, and the $\phi_3$ output 132 from the ÷3 counter 134 is applied as an enabling input to the $\Delta\phi$ counter 75. As previously described with respect to the time difference error calculator of FIG. 7, successive pairs of respective ones of red detected and red reference pulses are utilized to increment the $\Delta t$ counter 75 for the purpose of establishing therein a $\Delta t$ error count. In response to each successive X address on addressing line 79 from the red address counter 144, a previously stored $\Delta t$ error in storage RAM 78 is addressed out of RAM 78 and loaded into $\Delta t$ counter 75 for a subsequent updating. Reference is made to the control waveforms of FIG. 11 which depict the base clock 114 and the three-phase control signal output from the ÷3 counter 134. The $\phi_1$ pulse train is utilized as a write-enable function for the $\Delta t$ storage RAM and as an enabling input for the red address counter. The $\phi_2$ pulse train is utilized as a load-enable for the $\Delta t$ counter 75. The $\phi_3$ pulse train is utilized as an increment-enable for the $\Delta\phi$ counter 75. Referring to the base clock waveform of FIG. 11, it is seen that the three-phase waveform provides a synchronized means for sequentially effecting addressing of the Δt storage RAM 78, loading of the error stored therein into the Δt counter 75, and incrementing or decrementing control (update) for the Δt counter 75, is repeated sequences. A time interval is present between the trailing edge of a $\phi_1$ pulse and the leading edge of a successive $\phi_1$ pulse during which the Δt storage RAM may be read, followed by a time interval during which the count existing in the Δt counter 75 may be written into the storage RAM 78. Therefore, the desired sequence of control for the Δt development circuitry is realized, where a read/write sequence is executed for updating the Δt counter and storing the updated count for a next subsequent updating at each of the 256 successive red addresses inputted to RAM 78 from the red address counter 144.

Referring again to FIG. 12, and concerning the operation of the electronic switches 96 and 107 employed to affect four-quadrant multiplication, each of the switches is controlled by an associated latch so as to be in an open or closed position and, thus, determine whether the associated amplifier acts as an inverting or a noninverting element. Switch 96 associated with the Y deflection signal is controlled by the output of a latch 146 which receives the Y center control signal 126 and the Y overflow signal 119, as developed in FIG. 8. Switch 107 associated with the x deflection signal is controlled by the output of a latch 145 whose respective inputs are the reference horizontal centerline pulse 21c and the x counter overflow signal 129 as developed in FIG. 8.

VIDEO AMPLIFIER CONSIDERATIONS

Figure 14:
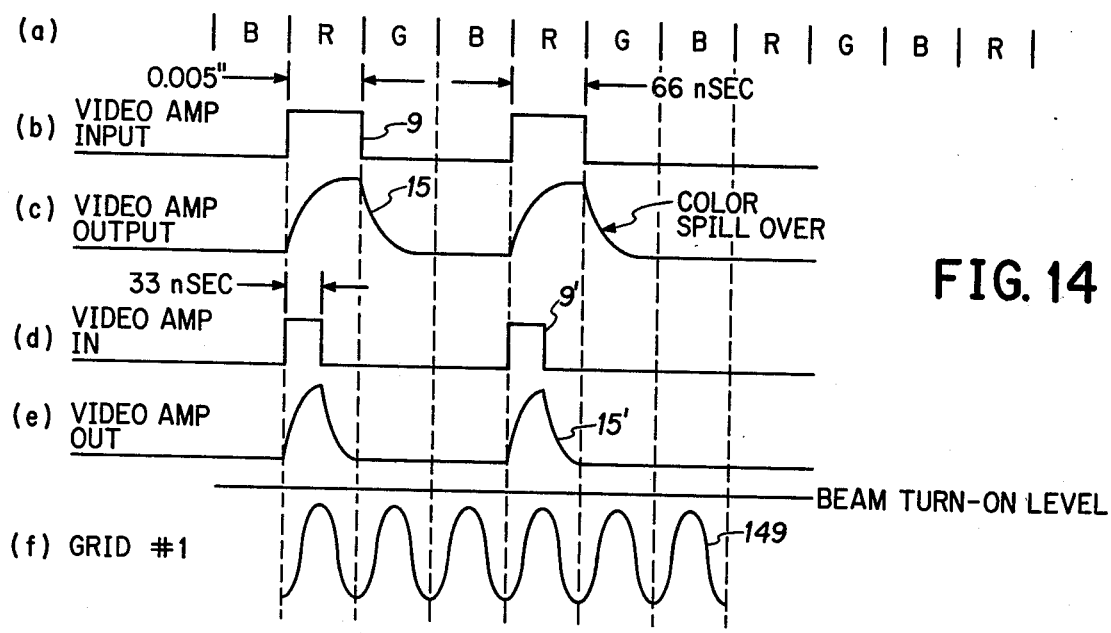
FIG. 14, waveforms depicting preferred video amplifier operation in response to video amplifier color-defined beam turn-on input control signals.
Figure 15:
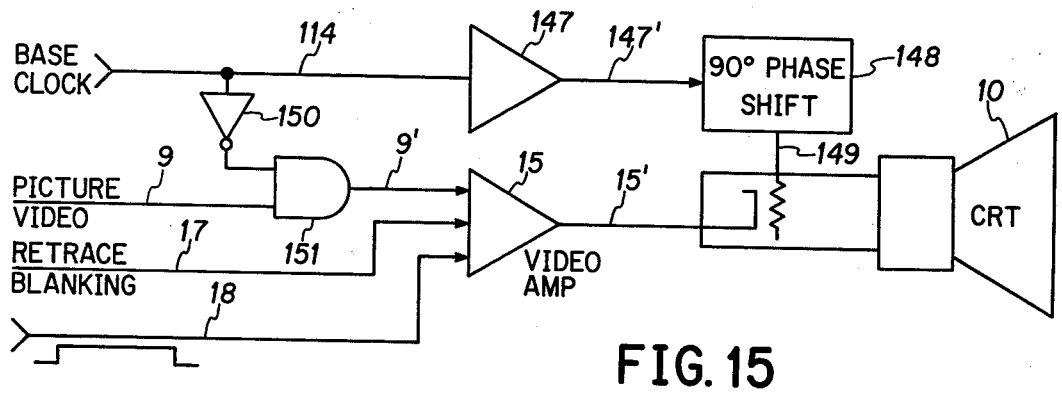
FIG. 15, a functional diagram implementing the preferred video amplifier control signals of FIG. 14.

Since a single cathode/grid cathode ray tube is employed in the system herein described, the generation of the video signal and the video amplifier design must be such that color spill-over from one video color slot to another is precluded. Reference is made to FIG. 14, which illustrates the color timing sequence in waveform A. Waveform B depicts successive red video on times which, in the exampled system, are 66 nanoseconds in duration. If the color input signal to the video amplifier is equal to the phosphor stripe width, color spillover will result as depicted in waveform C. Color spillover can be minimized by left-shifting the video color input signal with respect to the phosphor stripes; however, a better solution to color spillover is depicted in waveform D where the video amplifier input pulse-width is one-half the phosphor strip width, and a second signal, as depicted in waveform F, is applied to the modulation grid of the cathode ray tube. The grid signal depicted in waveform F is seen to sinusoidally vary in amplitude and always beneath the beam turn-on level of the tube. Valleys of the grid signal coincide with color transitions. With this approach, color spillover is minimized, with the video amplifier output signal combined with the modulation grid signal causing the beam to be beneath turn-on level at color transition times. The grid signal depicted in waveform F does not have to be modulated and may be easily tuned and phase shifted to track the video amplifier output signal. In the embodiment herein described, periodicy of the grid signal is that of the base clock and, thus, as depicted in FIG. 15, base clock signal 114 may be applied through 90° phase shifter 148 to produce the phase shifted signal 149 applied to the modulation grid of the cathode ray tube 10 (Waveform F, FIG. 14). Amplifier 147 may be chosen to have a response which outputs a sinusoidal type waveform in response to a square wave clock input. Picture video input 9' (Waveform D, FIG. 14) may be obtained by ANDing picture video 9 (Waveform B, FIG. 14) with a base clock complement signal obtained by applying base clock 114 to inverter 150.

SYSTEM CONSIDERATIONS

Since, in the beam indexing system herein described, error sampling techniques are used, certain aspects of the system must present uniformity to the correcting signal. These are:
 (a) the inside face place of the cathode ray tube must be flat.
 (b) the phosphor stripe spacings on the cathode ray tube must be uniformly spaced over the heighth of the display face.
 (c) the cathode ray tube vertical yoke must be aligned parallel with the phosphor stripes by proper yoke rotation and the tilt minimized.

The beam indexing system described herein offers advantages over shadow-mask multicolor cathode ray tubes, among which are:
 (d) non-susceptibility to the earth's magnetic field.
 (b) employment of a single beam with no convergence problems;
 (c) employment of a single beam with nonlinear magnification/deflection problems eliminated;
 (d) a more rugged cathode ray tube employing no shadow mask and a single beam;
 (e) improved beam current efficiency—an efficiency of nearly 100% compared to 15% to 20% for shadow mask cathode ray tubes.
 (f) a cathode ray tube cost factor comparable to monochrome tubes.

SUMMARY

The system defined herein is seen to operate on a sample beam indexing concept, wherein beam position corrections are determined for a single horizontal line in the nonviewed area of the raster. The system offers a method of determining off axis cos $\alpha_{xy}$ linearity correction terms from appreciably less complicated on-axis tan $\alpha_x$ and tan $\alpha_y$ calculations. The system provides a method of minimizing color spillover. The system employs a sample beam detection scheme utilizing a noncritically positioned light wedge and lens system in conjunction with a single photo diode detector, thus the cathode ray tube, per se, needs only an uncomplicated deposition of colored phosphor stripe triads with no special indexing strip elements. The system offers a simple incremental calculation of Δt and Δφ beam position errors, and accomplishes linearity correction and beam indexing by inserting a linear error correction (Δφ) and a non-linear error correction (Δt) into the deflection system.

Although the system as herein described employs the sampling of a single horizontal line appearing in the upper non-viewed portion of the raster, it is considered that the technique herein described is equally adaptable to the sampling of plural ones of horizontal lines in the nonviewed area of the raster, either on the top or bottom of the cathode ray tube face.

Thus, although the present invention has been described with respect to a particular embodiment thereof, it is not to be so limited, as changes might not be made therein which fall within the scope of the invention as defined in the appended claims.

What is claimed is:

1. In a multicolor cathode ray tube image display system wherein said tube comprises a single gun, single beam deflection system and carries on the face thereof a plurality of vertically extending parallel colored phosphor stripe triads, means for developing linear running x and y binary deflection counts definitive of beam deflection to establish a raster-type scan of the CRT beam on the face of said CRT, means operating in time synchronization with said raster scan to develop a train of reference video pulses corresponding to the red on-time of video signals applied to said tube, means responsive to impingement of said beam on successive red stripes of said plurality of color-stripe triads on a single horizontal line of said raster scan to develop a train of detected pulses, means for establishing time correspondence between a horizontal centerline defining one of said reference pulses and a corresponding one of said detected pulses; means for developing a digital error count corresponding to time displacement between successive pairs of respective ones of said reference pulses and said detected pulses, means for storing said time displacement error counts at addresses defined by corresponding deflection binary counts for successive ones of said red phosphor stripes, and means operable during successive horizontal scans of a raster frame subsequent to said error determination to read out and combine successive addressed ones of said error counts with the addressing one of said deflection counts.

2. The system of claim 1 comprising means responsive to successive beam position defining pairs of x and y binary deflection counts to develop binary signals representing cos $\alpha_{xy}$ for that beam position, where $\alpha_{xy}$ is the beam deflection angle measured from the zero deflection position of said beam to the deflected beam axis; means for multiplying said corrected x deflection count with the cos $\alpha_{xy}$ signal defined for that x deflection count, said means for establishing time correspondence comprising means for developing a binary count corresponding to the center-line position error between said center-line defining one of said reference pulses and said corresponding one of said detected pulses, and means for offsetting the x beam deflection signal defined by the aforedefined product in accordance with said center-line error.

3. The system of claim 2 comprising photo sensitive diode means responsive to impingement of said beam on successive ones of said red phosphor stripes to develop said train of detected pulses.

4. The display system of claims 2 or 3, wherein said means for developing binary signals representing cos $\alpha_{xy}$ comprises a first ROM having stored therein at addresses corresponding to each successive horizontal deflection count the value of $\tan^2 \alpha_x$ defined for that count, where $\alpha_x$ is the on-axis linear beam deflection angle defined for that count; a second ROM having stored therein at addresses corresponding to each successive vertical deflection count the value of $\tan^2 \alpha_y$ defined for that count, where $\alpha_y$ is the on-axis linear deflection angle defined for that count; means for addressing said ROM's for value readouts corresponding to respective horizontal and vertical deflection count addressing inputs thereto; means for adding the successively outputted values from said ROM's to obtain summations corresponding to $\tan^2\alpha_{xy}$, and a further ROM receiving the output of said means for adding as an addressing input thereto and supplying an output corresponding to cos $\alpha_{xy}$ for each successive $\tan^2 \alpha_{xy}$ addressing input thereto.

5. The display system of claim 4 wherein said means for establishing time correspondence comprises a D-type flip-flop with said train of detected pulses applied to the D input thereof and said reference center-line defining one of said train of reference video pulses applied to the clock input thereof, first and second AND gates, the Q output of said flip-flop being applied as a first input to said first AND gate, the $\overline{Q}$ output of said flip-flop being applied as a first input to said second AND gate, said train of reference video pulses applied as a second input to each of said first and second AND gates, and up-down binary counter receiving the outputs of said first and second AND gates as respective incrementing and decrementing inputs thereto, and means for offsetting the x beam deflection signal in said system as a function of the count accumulated in said counter.

6. The display system of claim 5 wherein said means for developing said time displacement error counts comprises a further binary up-down counter, means comparing relative time positions between successive pairs of respective ones of said train of reference video pulses and train of detected pulses, means for decrementing said further counter in response to the reference video pulse of a compared pulse pair preceding the detected pulse of that compared pulse pair and for incrementing said further counter in response to the reference video pulse of a compared pulse pair following the detected pulse of that compared pulse pair, means for developing binary addresses of successive ones of said reference video pulses, RAM storage means receiving said reference video pulse binary addresses; and control means synchronously responsive to each successive reference video pulse address to sequentially effect readout of said RAM storage means as a presetting count input to said further counter, enablement of said further counter for said incrementing or decrementing, and writing the incremented or decremented count in said further counter into said RAM storage means at that reference video pulse binary address.

7. In a raster scanned cathode ray tube display system wherein analog deflection signals are developed from digital-to-analog conversion of binary counts respectively definitive of x and y beam deflection signals, said tube having a pattern of repeated color phosphor triad stripes extending vertically across the tube face with the lines of said raster scan being perpendicular to said phosphor stripes, means for producing a linear reference pulse train corresponding to the video on-time of a predetermined one of the colors in successive ones of said color stripe triads, means for developing a sample train of pulses corresponding to beam impingement on successive ones of said predetermined color stripes on at least one horizontal scan of each frame of said raster, counting means for developing digital counts corresponding respectively to time-base and pulse-pair phase displacements between said reference and beam samples pulse trains, and means responsive to successive x deflection defining binary counts during the ensuing portion of said raster frame to alter said x beam deflective signal as a function of said time base and pulse-pair phase displacement definitive displacements.

8. The system of claim 7, with means response to successive x and y binary address defining counts to calculate a binary signal representing cos $\alpha_{xy}$, where $\alpha_{xy}$ is the angle between the beam center axis and the beam for each x-y defined deflection address, and means for multiplying successive x address defining counts by said cos $\alpha_{xy}$ defining count to effect correction of pincushion distortion of said raster.

9. The display system of claim 8, wherein said means for developing binary signals representing cos $\alpha_{xy}$ comprises a first ROM having stored therein at addresses corresponding to each successive horizontal deflection count the value of $\tan^2 \alpha_x$ defined for that count, where $\alpha_x$ is the on-axis linear beam deflection angle defined for that count; a second ROM having stored therein at addresses corresponding to each successive vertical deflection count the value of $\tan^2 \alpha_x$ defined for that count, where $\alpha_y$ is the on-axis linear deflection angle defined for that count; means for addressing said ROM's for value readouts corresponding to respective horizontal and vertical deflection count addressing inputs thereto; means for adding the successively outputted values for said ROM's to obtain summations corresponding to $\tan^2 \alpha_{xy}$, and a further ROM receiving the output of said means for adding as an addressing input thereto and supplying an output corresponding to cos $\alpha_{xy}$ for each successive $\tan^2 \alpha_{xy}$ addressing input thereto.

10. The display system of claims 8 or 9 wherein said means for developing said time base displacement digital count comprises a D-type flip-flop with said sample pulse train applied to the D input thereof, and a reference center-line defining pulse of said reference pulse train applied to the clock input thereof, first and second AND gates, the Q output of said flip-flop being applied as a first input to said first AND gate, the $\overline{Q}$ output of said flip-flop being applied as a first input to said second AND gate, said reference pulse train applied as a second input to each of said first and second AND gates, an up-down binary counter receiving the outputs of said first and second AND gates as respective incrementing and decrementing inputs thereto, the count accumulated in said counter comprising said time base displacement digital count; and further comprising means to offset said x deflection signal as a function of said time base displacement digital count.

11. The display system of claim 10 wherein said means for developing said pulse-pair phase displacement digital count comprises a further binary up-down counter, means for comparing relative time positions between successive pairs of respective ones of pulses in said reference and detected pulse trains, means for decrementing said further counter in response to the reference pulse of a compared pulse pair preceding the detected pulse of that compared pulse pair and for incrementing said further counter in response to the reference pulse of a compared pulse pair following the detected pulse of that compared pulse pair, means for developing binary addresses of successive ones of said reference pulses, RAM storage means receiving said reference pulse binary addresses; and control means synchronously responsive to each successive reference pulse address to sequentially effect readout of said RAM storage means as a presetting count input to said further counter, enablement of said further counter for said incrementing or decrementing, and writing the incremented or decremental count in said further counter into said RAM storage means at that reference pulse binary address.

12. A beam indexing system for a cathode ray tube, said tube having a plurality of vertical disposed color stripe phosphor triads upon which the beam of said tube is caused to impinge, comprising means for generating respective binary addresses corresponding to linear x and y beam positions definitive of a repetitive raster scan of a plurality of horizontal lines defining a raster frame, means for generating a reference pulse train comprising a train of pulses corresponding to successive x addresses along a predetermined single-line defining sequence of x addresses definitive of video red on-time intervals for that horizontal line, a sample beam detecting means responsive to impingement of said beam on successive ones of said red phosphor stripes in said color stripe triads along said predetermined single horizontal line to generate a beam sample pulse train; means for comparing the horizontal displacement of a beam center defining one of said beam sample pulses with a center defining one of said video reference pulses to develop a phase error correction signal; means comparing the horizontal displacement between successive pairs of respective ones of sample and reference pulses to develop a timing error signal for each said successive pulse pair, means for storing successive ones of said timing error signals at binary addresses corresponding to the linear x position sweep address for that pulse pair, means responsive to each x address in successive lines of said frame to address the stored tuning error signal at that address, means for adding said addressed timing error signal to the linear x address signal, and means for adding a correction signal defined by said phase error signal to the x deflection signal for said beam during successive ones of raster lines for the remainder of said frame.

13. In a multicolor cathode ray tube display system wherein said tube comprises a single gun and single beam, said tube having a plurality of paralleled color stripe phosphor triads on the face thereof and means for developing a raster deflection system for said single beam whereby said beam is caused to be scanned perpendicular to said phosphor triads across the tube face; a clock pulse source, means to apply said clock pulse source to a binary counting means to develop clock synchronous linear horizontal and vertical digital counts collectively definitive of x and y deflection signals to effect a raster scan of said beam; means for developing a first correction signal for said horizontal and vertical digital counts as a function of the deflection angle of the beam from a center beam position where said beam is normal to the face of said cathode ray tube; means for developing a clock-defined reference pulse train the pulses of which correspond to successive horizontal count address defined positions of successive ones of red stripes of each of said stripe triads, means for developing a sample detected pulse train respective pulses of which correspond to successive beam impingement upon red stripes of said stripe triads, means for developing a second correction signal proportional to the phase displacement between a center one of said reference red pulses and a center one of said detected pulses; means for developing a third correction signal proportional to the time discrepancy between like sequential ones of said reference and detected red pulses, means for storing said third correction signals at the horizontal digital count defined address for that pulse-pair; first means for summing each successive horizontal binary count with that one of said third correction signals developed for that horizontal count; first means for multiplying said vertical digital count by said first correction signal and applying the product to effect vertical deflection of said cathode ray tube beam; second means for multiplying said horizontal binary count by the output of said first means for summing; and second means for summing the output of said second means for multiplying with said second correction signal and applying the product to effect horizontal deflection of said cathode ray tube beam.

14. The system of claim 13 wherein said cathode ray tube comprises a cathode to which the output of a video amplifier is applied to control beam current generation and a modulation grid means for further controlling the generator of said beam current; means for generating a bias signal and applying said bias signal to said grid means, said bias signal comprising a sinusoidally varying signal of periodicy equal that of said clock pulse source and 90° out of phase therewith; said bias signal having a positive peak voltage level beneath the beam turn-on level of said cathode ray tube, and said video amplifier comprising means to receive a clock pulse source synchronous binary video input control signal comprising selective pulses, each of which is time synchronous with beam impingement on a selected one of said color phosphor stripes and of a time duration corresponding to beam deflection across the first halve of the width of said strips, whereby said cathode ray tube beam is biased to cut off said beam as it impinges successive color phosphor stripe transitions on the face of said cathode ray tube.

* * * * *